(12) United States Patent
Shen et al.

(10) Patent No.: US 12,057,884 B2
(45) Date of Patent: Aug. 6, 2024

(54) WIRELESS RADIO FREQUENCY CONVERSION SYSTEM AND WIRELESS RADIO FREQUENCY CONVERSION METHOD

(71) Applicant: AuthenX Inc., Hsinchu County (TW)

(72) Inventors: Po-Kuan Shen, Hsinchu County (TW);
Yu-Chun Wang, Hsinchu County (TW); Kai-Lun Han, Hsinchu County (TW); Jenq-Yang Chang, Hsinchu County (TW); Mao-Jen Wu, Hsinchu County (TW)

(*) Notice: Subject to any disclaimer, the term of this patent is extended or adjusted under 35 U.S.C. 154(b) by 26 days.

(21) Appl. No.: 17/930,422

(22) Filed: Sep. 8, 2022

(65) Prior Publication Data

US 2023/0078817 A1    Mar. 16, 2023

Related U.S. Application Data

(60) Provisional application No. 63/242,545, filed on Sep. 10, 2021.

(51) Int. Cl.
*H04B 10/00* (2013.01)
*H04B 10/2575* (2013.01)

(52) U.S. Cl.
CPC . *H04B 10/25753* (2013.01); *H04B 10/25752* (2013.01)

(58) Field of Classification Search
CPC .......... H04B 10/2575; H04B 10/25752; H04B 10/25753; H04B 10/25754; H04B 10/25758; H04B 10/25759; H04B 10/27; H04B 10/40; H04B 20/2507; H04B 10/516; H04B 10/548; H04B 10/58; H04B 10/5561; H04B 10/2507
USPC ....... 398/66, 67, 68, 69, 70, 71, 72, 79, 115, 398/116, 117, 158, 159, 135, 136, 137, 398/138, 139, 183, 188, 100, 82
See application file for complete search history.

(56) References Cited

U.S. PATENT DOCUMENTS

| | | | |
|---|---|---|---|
| 7,349,634 B2 | 3/2008 | Sasai et al. | |
| 9,184,962 B2 | 11/2015 | Tarlazzi et al. | |
| 10,075,779 B2 | 9/2018 | Erreygers et al. | |
| 10,749,566 B2 * | 8/2020 | Burke | H03H 11/344 |
| 10,868,572 B2 * | 12/2020 | Wang | H04B 10/2575 |
| 2002/0057868 A1 | 5/2002 | Wu et al. | |

(Continued)

*Primary Examiner* — Hanh Phan

(57) ABSTRACT

A wireless radio frequency conversion system is disclosed. The baseband device generates or receives a baseband signal. The remote radio device transforms between the baseband signal and a radio frequency signal. The beamforming device adjusts amplitude and phase of the radio frequency signal or adjusts scale factor and phase factor of the baseband signal. The conversion device performs an optical-electrical conversion to the radio frequency signal. One of the beamforming device, the conversion device, and the wireless radio frequency conversion system having a one-to-many conversion device performs a one-to-many conversion to the radio frequency signal or the baseband signal to generate radio frequency signals or baseband signals, or performs a many-to-one conversion to the radio frequency signals or the baseband signals to generate the radio frequency signal or the baseband signal. The front-end module amplifies the radio frequency signal. The antenna transmits or receives the radio frequency signal.

30 Claims, 10 Drawing Sheets

(56) References Cited

U.S. PATENT DOCUMENTS

| | | |
|---|---|---|
| 2009/0252139 A1 | 10/2009 | Ludovico et al. |
| 2011/0243502 A1 | 10/2011 | Matsuura |
| 2011/0275376 A1 | 11/2011 | Boldi et al. |
| 2012/0014694 A1 | 1/2012 | Templ et al. |
| 2012/0039603 A1 | 2/2012 | Wiegner et al. |
| 2013/0169483 A1 | 7/2013 | Vidal Drummond et al. |
| 2015/0229397 A1* | 8/2015 | Shibata ............ H04B 10/25754 398/115 |
| 2017/0047996 A1 | 2/2017 | Feng |
| 2017/0054482 A1 | 2/2017 | Forenza et al. |
| 2017/0126320 A1 | 5/2017 | Cho et al. |
| 2018/0159604 A1 | 6/2018 | Won et al. |
| 2018/0269939 A1 | 9/2018 | Hu et al. |
| 2019/0069300 A1 | 2/2019 | Ramamurthi et al. |
| 2019/0267708 A1 | 8/2019 | Tennant et al. |
| 2022/0231764 A1* | 7/2022 | Ghannouchi .... H04B 10/25759 |

\* cited by examiner

WIRELESS RADIO FREQUENCY CONVERSION SYSTEM AND WIRELESS RADIO FREQUENCY CONVERSION METHOD

CROSS-REFERENCE TO RELATED APPLICATION

This application claims priority to U.S. Provisional Application Ser. No. 63/242,545 filed Sep. 10, 2021, the disclosures of which are incorporated herein by reference in their entireties.

BACKGROUND

Field of Invention

The present disclosure relates to a wireless transmission system and a wireless transmission method. More particularly, the present disclosure relates to a wireless radio frequency conversion system and a wireless radio frequency conversion method.

Description of Related Art

Millimeter wave technology brings many performance benefits and it is an essential part of the 5th generation mobile networks (5G) system.

However, millimeter wave technology has several well-known communication problems, such as: path transmission loss, transmission attenuation through walls, and so on. Therefore, there is a need to provide a new system disposition for 5G network so as to meet the need of 5G network. As such, there is an urgent need for industry to find out a solution.

SUMMARY

The foregoing presents a simplified summary of the disclosure in order to provide a basic understanding to the reader. This summary is not an extensive overview of the disclosure and it does not identify key/critical elements of the present disclosure or delineate the scope of the present disclosure. Its sole purpose is to present some concepts disclosed herein in a simplified form as a prelude to the more detailed description that is presented later.

The present disclosure provides a wireless radio frequency conversion system. The wireless radio frequency conversion system includes a baseband device, a remote radio device, a beamforming device, a conversion device, an optical fiber network, a plurality of front-end processing devices, and a plurality of antennas. The baseband device is configured to generate or receive a baseband signal. The remote radio device is configured to perform a conversion between the baseband signal and a radio frequency signal. The beamforming device is configured to adjust an amplitude and a phase of the radio frequency signal, or adjust a scale factor and a phase factor of the baseband signal. The conversion device is configured to perform an optical-electrical conversion to the radio frequency signal. The optical fiber network is configured to transmit the radio frequency signal which is converted through the optical-electrical conversion. One of the beamforming device, the conversion device, and the wireless radio frequency conversion system each having a one-to-many conversion device is configured to perform a one-to-many conversion to the radio frequency signal or the baseband signal so as to generate a plurality of radio frequency signals or a plurality of baseband signals, or perform a many-to-one conversion to the plurality of radio frequency signals or the plurality of baseband signals so as to generate the radio frequency signal or the baseband signal. The plurality of front-end processing devices are configured to amplify the plurality of radio frequency signals. The plurality of antennas are configured to transmit or receive the plurality of radio frequency signals.

In one embodiment, the conversion device comprises a first convertor and a second convertor. The first convertor is configured to receive and perform the optical-electrical conversion to the radio frequency signal from the remote radio device so as to generate an optical signal, or configured to receive and perform the optical-electrical conversion to the optical signal from the optical fiber network so as to generate the radio frequency signal. The second convertor is configured to receive and perform the optical-electrical conversion to the optical signal from the optical fiber network so as to generate the radio frequency signal, or configured to receive and perform the optical-electrical conversion to the radio frequency signal from the beamforming device so as to generate the optical signal.

In one embodiment, a one-to-many convertor of the beamforming device is configured to receive and perform the one-to-many conversion to the radio frequency signal from the second convertor so as to generate the plurality of radio frequency signals, or configured to receive and perform the many-to-one conversion to the plurality of radio frequency signals from the plurality of front-end processing devices as so to generate the radio frequency signal.

In one embodiment, a one-to-many convertor of the beamforming device is configured to receive and perform the one-to-many conversion to the radio frequency signal from the remote radio device so as to generate the plurality of radio frequency signals, or configured to receive and perform the many-to-one conversion to the plurality of radio frequency signals so as to generate the radio frequency signal. The conversion device comprises a plurality of first convertors and a plurality of second convertors. The plurality of first convertors are configured to receive and perform the optical-electrical conversion to the plurality of radio frequency signals from the beamforming device so as to generate a plurality of optical signals, or configured to receive and perform the optical-electrical conversion to the plurality of optical signals from a plurality of optical fibers of the optical fiber network so as to generate the plurality of radio frequency signals. The plurality of second convertors are configured to receive and perform the optical-electrical conversion to the plurality of optical signals from the plurality optical fibers of the optical fiber network so as to generate the plurality of radio frequency signals, or configured to receive and perform the optical-electrical conversion to the plurality of radio frequency signals from the plurality of front-end processing devices so as to generate the plurality of optical signals.

In one embodiment, the conversion device comprises a first convertor and a plurality of second convertors. The first convertor is configured to receive and perform the optical-electrical conversion and the one-to-many conversion to the radio frequency signal from the remote radio device so as to generate a plurality of optical signals, or configured to receive and perform the many-to-one conversion and the optical-electrical conversion to the plurality of optical signals from a plurality of optical fibers of the optical fiber network so as to generate the radio frequency signal. The plurality of second convertors are configured to receive and perform the optical-electrical conversion to the plurality of optical signals from the plurality optical fibers of the optical fiber network so as to generate the plurality of radio frequency signals, or configured to receive and perform the optical-electrical conversion to the plurality of radio frequency signals from the beamforming device so as to generate the plurality of optical signals.

In one embodiment, the beamforming device is configured to receive and adjust a plurality of amplitudes and a plurality of phases of the plurality of radio frequency signals from the second convertors, or configured to receive and adjust the plurality of amplitudes and the plurality of phases of the plurality of radio frequency signals from the plurality of front-end processing devices.

In one embodiment, the conversion device comprises a first convertor and a plurality of second convertors. The first convertor is configured to receive and perform the optical-electrical conversion to the radio frequency signal from the remote radio device so as to generate an optical signal, or configured to receive and perform the optical-electrical conversion to the optical signal so as to generate the radio frequency signal, wherein the one-to-many conversion device of the wireless radio frequency conversion system is configured to receive and perform the one-to-many conversion to the optical signal from the first convertor so as to generate a plurality of optical signals, or configured to receive and perform the many-to-one conversion to the plurality of optical signals so as to generate the optical signal. The plurality of second convertors are configured to receive and perform the optical-electrical conversion to the plurality of optical signals from the one-to-many conversion device of the wireless radio frequency conversion system so as to generate the plurality of radio frequency signals, or configured to receive and perform the optical-electrical conversion to the plurality of radio frequency signals from the beamforming device so as to generate the plurality of optical signals.

In one embodiment, the beamforming device is configured to receive and adjust a plurality of amplitudes and a plurality of phases of the plurality of radio frequency signals from the plurality of second convertors, or configured to receive and adjust the plurality of amplitudes and the plurality of phases of the plurality of radio frequency signals from the plurality of front-end processing devices.

In one embodiment, the beamforming device is a digital beamformer, the digital beamformer is configured to receive and adjust the scale factor and the phase factor of the baseband signal from the baseband device, wherein a one-to-many convertor of the digital beamformer is configured to perform the one-to-many conversion to the baseband signal so as to generate the plurality of baseband signals, or configured to receive and perform the many-to-one conversion to the plurality of baseband signals so as to generate the baseband signal. A number of the remote radio device is plural, the plurality of remote radio devices receive and convert the plurality of baseband signals from the one-to-many convertor into a plurality of radio frequency signals, or configured to receive and convert the plurality of radio frequency signals into the plurality of baseband signals.

In one embodiment, the conversion device comprises a plurality of first convertors and a plurality of second convertors. The plurality of first convertors are configured to receive and perform the optical-electrical conversion to the plurality of radio frequency signals from the plurality of remote radio devices so as to generate a plurality of optical signals, or configured to receive and perform the optical-electrical conversion to the plurality of optical signals from a plurality of optical fibers of the optical fiber network so as to generate the plurality of radio frequency signals. The plurality of second convertors are configured to receive and perform the optical-electrical conversion to the plurality of optical signals from the plurality optical fibers of the optical fiber network so as to generate the plurality of radio frequency signals, or configured to receive and perform the optical-electrical conversion to the plurality of radio frequency signals from the plurality of front-end processing devices so as to generate the plurality of optical signals.

In one embodiment, the wireless radio frequency conversion system further comprises a digital beamformer. The digital beamformer is configured to receive and adjust the scale factor and the phase factor of the baseband signal from the baseband device, wherein a one-to-many convertor of the digital beamformer is configured to perform the one-to-many conversion to the baseband signal so as to generate a first baseband signal and a second baseband signal, or configured to receive and perform the many-to-one conversion to the first baseband signal and the second baseband signal so as to generate the baseband signal. The remote radio device comprises a first remote radio circuit and a second remote radio circuit. The first remote radio circuit is configured to receive and convert the first baseband signal from the one-to-many convertor into a first radio frequency signal, or configured to receive and convert the first radio frequency signal into the first baseband signal. The second remote radio circuit is configured to receive and convert the second baseband signal from the one-to-many convertor into a second radio frequency signal, or configured to receive and convert the second radio frequency signal into the second baseband signal. The conversion device comprises a first convertor. The first convertor is configured to receive and perform the optical-electrical conversion and the one-to-many conversion to the first radio frequency signal from the first remote radio circuit so as to generate a plurality of optical signals, or configured to receive and perform the many-to-one conversion and the optical-electrical conversion to the plurality of optical signals from a plurality of optical fibers of the optical fiber network so as to generate the first radio frequency signal.

In one embodiment, the conversion device further comprises a second convertor and a plurality of third convertors. The second convertor is configured to receive and perform the optical-electrical conversion and one-to-many conversion to the second radio frequency signal from the second remote radio circuit so as to generate a plurality of optical signals, or configured to receive and perform the many-to-one conversion and the optical-electrical conversion to the plurality of optical signals from the plurality optical fibers of the optical fiber network so as to generate the second radio frequency signal. The plurality of third convertors are configured to receive and perform the optical-electrical conversion to the plurality of optical signals from the plurality optical fibers of the optical fiber network so as to generate the plurality of radio frequency signals, or configured to receive and perform the optical-electrical conversion to the plurality of radio frequency signals so as to generate the plurality of optical signals.

In one embodiment, a number of the beamforming device is plural, the plurality of beamforming devices are configured to receive and adjust a plurality of amplitudes and a plurality of phases of the plurality of radio frequency signals from the plurality of third convertors, or configured to receive and adjust the plurality of amplitudes and the plurality of phases of the plurality of radio frequency signals from the plurality of front-end processing devices.

In one embodiment, each of the first convertor and the second convertor comprises a first one-to-many distributor. The first one-to-many distributor comprises a first laser diode package structure, a first beamsplitter, a first connector, a second beamsplitter, and a second connector. The first laser diode package structure is configured to convert the first radio frequency signal or the second radio frequency signal into one of the plurality of optical signals. The first beamsplitter is configured to partially reflect one of the plurality of optical signals to generate a first reflect signal, and partially penetrate one of the plurality of optical signals to generate a first penetrating signal. The first connector is configured to output the first reflect signal to be one of the plurality of optical signals. The second beamsplitter is configured to reflect the first penetrating signal to generate a second reflect signal. The second connector is configured to output the second reflect signal to be one of the plurality of optical signals.

In one embodiment, each of the first convertor and the second convertor comprises a second one-to-many distributor. The second one-to-many distributor comprises a third connector, a third beamsplitter, a fourth connector, a fourth beamsplitter, and a second laser diode package structure. The third connector is configured to receive one of the plurality of optical signals. The third beamsplitter is configured to receive and reflect one of the plurality of optical signals from the third connector to generate a third reflect signal. The fourth connector is configured to receive one of the plurality of optical signals. The fourth beamsplitter is configured to receive and reflect one of the plurality of optical signals from the fourth connector, and receive and penetrate the third reflect signal from the third beamsplitter to generate one of the plurality of optical signals. The second laser diode package structure is configured to convert one of the plurality of optical signals into the first radio frequency signal or the second radio frequency signal.

In one embodiment, the wireless radio frequency conversion system comprises a digital beamformer. The digital beamformer is configured to receive and adjust the scale factor and the phase factor of the baseband signal from the baseband device, wherein a one-to-many convertor of the digital beamformer performs the one-to-many conversion to the baseband signal so as to generate a first baseband signal and a second baseband signal, or configured to receive and perform the many-to-one conversion to the first baseband signal and the second baseband signal so as to generate the baseband signal. The remote radio device comprises a first remote radio circuit and a second remote radio circuit. The first remote radio circuit is configured to receive and convert the first baseband signal from the one-to-many convertor into a first radio frequency signal, or configured to receive and convert the first radio frequency signal into the first baseband signal. The second remote radio circuit is configured to receive and convert the second baseband signal from the one-to-many convertor into a second radio frequency signal, or configured to receive and convert the second radio frequency signal into the second baseband signal. The conversion device comprises a first convertor. The first convertor is configured to receive and perform the optical-electrical conversion to the first radio frequency signal from the first remote radio circuit so as to generate a first optical signal, or configured to receive and perform the optical-electrical conversion to the first optical signal from the optical fiber network so as to generate the first radio frequency signal.

In one embodiment, the conversion device further comprises a second convertor and a plurality of third convertors. The second convertor is configured to receive and perform the optical-electrical conversion to the second radio frequency signal from the second remote radio circuit so as to generate a second optical signal, or configured to receive and perform the optical-electrical conversion to the second optical signal from the optical fiber network so as to generate the second radio frequency signal, wherein the one-to-many conversion device of the wireless radio frequency conversion system comprises a first one-to-many convertor and a second one-to-many convertor, wherein the first one-to-many convertor is configured to receive and perform the one-to-many conversion to the first optical signal from the first convertor so as to generate a plurality of optical signals, or configured to receive and perform the many-to-one conversion to the plurality of optical signals so as to generate the first optical signal, wherein the second one-to-many convertor is configured to receive and perform the one-to-many conversion to the second optical signal from the second convertor so as to generate a plurality of optical signals, or configured to receive and perform the many-to-one conversion to the plurality of optical signals so as to generate the second optical signal. The plurality of third convertors are configured to receive and perform the optical-electrical conversion to the plurality of optical signals from the first one-to-many convertor and the second one-to-many convertor so as to generate the plurality of radio frequency signals, or configured to receive and perform the optical-electrical conversion to the plurality of radio frequency signals so as to generate the plurality of optical signals.

In one embodiment, a number of the beamforming device is plural, the plurality of beamforming devices are configured to receive and adjust a plurality of amplitudes and a plurality of phases of the plurality of radio frequency signals from the plurality of third convertors, or configured to receive and adjust the plurality of amplitudes and the plurality of phases of the plurality of radio frequency signals from the plurality of front-end processing devices.

In one embodiment, each of the first convertor and the second convertor comprises a bidirectional optical transceiver. The bidirectional optical transceiver comprises a first laser diode package structure, a second laser diode package structure, a filter, and a housing. The first laser diode package structure is configured to convert the first radio frequency signal or the second radio frequency signal into the first optical signal or the second optical signal. The second laser diode package structure is configured to convert the first optical signal or the second optical signal into the first radio frequency signal or the second radio frequency signal. The filter is configured to penetrate the first optical signal or the second optical signal of the first laser diode package structure, and configured to reflect the first optical signal or the second optical signal to the second laser diode package structure. The filter is disposed inside the housing, and the first laser diode package structure and the second laser diode package structure are disposed outside the housing and attached to the housing.

In one embodiment, each of the first one-to-many convertor and the second one-to-many convertor comprises a first beamsplitter, a first connector, a second beamsplitter, and a second connector. The first beamsplitter is configured to partially reflect the first optical signal or the second optical signal so as to generate a first reflect signal, and partially penetrate the first optical signal or the second optical signal so as to generate a first penetrating signal. The first connector is configured to output the first reflect signal to be one of the plurality of optical signals. The second beamsplitter is configured to reflect the first penetrating signal so as to generate a second reflect signal. The second connector is configured to output the second reflect signal to be one of the plurality of optical signals.

In one embodiment, the second connector is configured to receive one of the plurality of optical signals. The second beamsplitter is configured to receive and reflect one of the plurality of optical signals from the second connector to generate a third reflect signal. The first connector is configured to receive one of the plurality of optical signals. The first beamsplitter is configured to receive and reflect one of the plurality of optical signals from the first connector, and receive and penetrate the third reflect signal from the second beamsplitter to generate the first optical signal or the second optical signal.

The present disclosure provides a wireless radio frequency conversion method. The wireless radio frequency conversion method includes generating or receiving a baseband signal through a baseband device; performing a conversion between the baseband signal and a radio frequency signal through a remote radio device; adjusting an amplitude and a phase of the radio frequency signal or adjusting a scale factor and a phase factor of the baseband signal through a beamforming device; performing an optical-electrical conversion to the radio frequency signal through a conversion device; transmitting the radio frequency signal which is converted by the optical-electrical conversion through an optical fiber network; performing a one-to-many conversion to the radio frequency signal or the baseband signal through a one-to-many conversion device of one of the beamforming device, the conversion device, and a wireless radio frequency conversion system so as to generate a plurality of radio frequency signals or a plurality of baseband signals, or performing a many-to-one conversion to the plurality of radio frequency signals or the plurality of baseband signals through the one-to-many conversion device of one of the beamforming device, the conversion device, and the wireless radio frequency conversion system so as to generate the radio frequency signal or the baseband signal; amplifying the plurality of radio frequency signals through a plurality of front-end processing devices; and transmitting or receiving the plurality of radio frequency signals through a plurality of antennas.

In one embodiment, the step of performing the optical-electrical conversion to the radio frequency signal through the conversion device comprises: receiving and performing the optical-electrical conversion to the radio frequency signal from the remote radio device through a first convertor of the conversion device so as to generate an optical signal, or receiving and performing the optical-electrical conversion to the optical signal from the optical fiber network so as to generate the radio frequency signal; and receiving and performing the optical-electrical conversion to the optical signal from the optical fiber network through a second convertor of the conversion device so as to generate the radio frequency signal, or receiving and performing the optical-electrical conversion to the radio frequency signal from the beamforming device so as to generate the optical signal. The step of performing the one-to-many conversion to the radio frequency signal or the baseband signal through the one-to-many conversion device of one of the beamforming device, the conversion device, and the wireless radio frequency conversion system so as to generate the plurality of radio frequency signals or the plurality of baseband signals, or performing the many-to-one conversion to the plurality of radio frequency signals or the plurality of baseband signals through the one-to-many conversion device of one of the beamforming device, the conversion device, and the wireless radio frequency conversion system to the radio frequency signal or the baseband signal so as to generate the radio frequency signal or the baseband signal comprises: receiving and performing the one-to-many conversion to the radio frequency signal from the second convertor through a one-to-many convertor of the beamforming device so as to generate the plurality of radio frequency signals, or receiving and performing the many-to-one conversion to the plurality of radio frequency signals from the plurality of front-end processing devices so as to generate the radio frequency signal.

In one embodiment, the step of performing the one-to-many conversion to the radio frequency signal or the baseband signal through the one-to-many conversion device of one of the beamforming device, the conversion device, and the wireless radio frequency conversion system so as to generate the plurality of radio frequency signals or the plurality of baseband signals, or performing the many-to-one conversion to the plurality of radio frequency signals or the plurality of baseband signals through the one-to-many conversion device of one of the beamforming device, the conversion device, and the wireless radio frequency conversion system so as to generate the radio frequency signal or the baseband signal comprises: receiving and performing the one-to-many conversion to the radio frequency signal from the remote radio device through a one-to-many convertor of the beamforming device so as to generate the plurality of radio frequency signals, or receiving and performing the many-to-one conversion to the plurality of radio frequency signals so as to generate the radio frequency signal. The step of performing the optical-electrical conversion to the radio frequency signal through the conversion device comprises: receiving and performing the optical-electrical conversion to the plurality of radio frequency signals from the beamforming device through a plurality of first convertors of the conversion device so as to generate a plurality of optical signals, or receiving and performing the optical-electrical conversion to the plurality of optical signals from a plurality of optical fibers of the optical fiber network so as to generate the plurality of radio frequency signals; and receiving and performing the optical-electrical conversion to the plurality of optical signals from the plurality optical fibers of the optical fiber network through a plurality of second convertors of the conversion device so as to generate the plurality of radio frequency signals, or receiving and performing the optical-electrical conversion to the plurality of radio frequency signals from the plurality of front-end processing devices so as to generate the plurality of optical signals.

In one embodiment, the step of performing the optical-electrical conversion to the radio frequency signal through the conversion device comprises: receiving and performing the optical-electrical conversion and the one-to-many conversion to the radio frequency signal from the remote radio device through a first convertor of the conversion device so as to generate a plurality of optical signals, or receiving and performing the many-to-one conversion and the optical-electrical conversion to the plurality of optical signals from a plurality of optical fibers of the optical fiber network so as to generate the radio frequency signal; and receiving and performing the optical-electrical conversion to the plurality of optical signals from the plurality optical fibers of the optical fiber network through a plurality of second convertors of the conversion device so as to generate the plurality of radio frequency signals, or receiving and performing the optical-electrical conversion to the plurality of radio frequency signals from the beamforming device so as to generate the plurality of optical signals. The step of performing the one-to-many conversion to the radio frequency signal or the baseband signal through the one-to-many conversion device of one of the beamforming device, the conversion device, and the wireless radio frequency conversion system so as to generate the plurality of radio frequency signals or the plurality of baseband signals, or performing the many-to-one conversion to the plurality of radio frequency signals or the plurality of baseband signals through the one-to-many conversion device of one of the beamforming device, the conversion device, and the wireless radio frequency conversion system so as to generate the radio frequency signal or the baseband signal comprises: receiving and adjusting a plurality of amplitudes and a plurality of phases of the plurality of radio frequency signals from the second convertors through the beamforming device, or receiving and adjusting the plurality of amplitudes and the plurality of phases of the plurality of radio frequency signals from the plurality of front-end processing devices.

In one embodiment, the step of performing the optical-electrical conversion to the radio frequency signal through the conversion device comprises: receiving and performing the optical-electrical conversion to the radio frequency signal from the remote radio device through a first convertor of the conversion device so as to generate an optical signal, or receiving and performing the optical-electrical conversion to the optical signal so as to generate the radio frequency signal; and receiving and performing the optical-electrical conversion to the plurality of optical signals from the one-to-many conversion device of the wireless radio frequency conversion system through a plurality of second convertors of the conversion device so as to generate the plurality of radio frequency signals, or receiving and performing the optical-electrical conversion to the plurality of radio frequency signals from the beamforming device so as to generate the plurality of optical signals. The step of performing the one-to-many conversion to the radio frequency signal or the baseband signal through the one-to-many conversion device of one of the beamforming device, the conversion device, and the wireless radio frequency conversion system so as to generate the plurality of radio frequency signals or the plurality of baseband signals, or performing the many-to-one conversion to the plurality of radio frequency signals or the plurality of baseband signals through the one-to-many conversion device of one of the beamforming device, the conversion device, and the wireless radio frequency conversion system so as to generate the radio frequency signal or the baseband signal comprises: receiving and performing the one-to-many conversion to the optical signal from the first convertor through the one-to-many conversion device of the wireless radio frequency conversion system so as to generate a plurality of optical signals, or receiving and performing the many-to-one conversion to the plurality of optical signals so as to generate the optical signal. The step of adjusting the amplitude and the phase of the radio frequency signal through the beamforming device comprises: receiving and adjusting a plurality of amplitudes and a plurality of phases of the plurality of radio frequency signals from the second convertors through the beamforming device, or receiving and adjusting the plurality of amplitudes and the plurality of phases of the plurality of radio frequency signals from the plurality of front-end processing devices.

In one embodiment, the beamforming device is a digital beamformer. The wireless radio frequency conversion method further comprises: receiving and adjusting the scale factor and the phase factor of the baseband signal from the baseband device through the digital beamformer, and performing the one-to-many conversion to the baseband signal through a one-to-many convertor of the digital beamformer so as to generate the plurality of baseband signals, or receiving and performing the many-to-one conversion to the plurality of baseband signals so as to generate the baseband signal. The step of performing the conversion between the baseband signal and the radio frequency signal through the remote radio device comprises: receiving and converting the plurality of baseband signals from the one-to-many convertor through a plurality of remote radio devices into a plurality of radio frequency signals, or receiving and converting the plurality of radio frequency signals into the plurality of baseband signals. The step of performing the optical-electrical conversion to the radio frequency signal through the conversion device comprises: receiving and performing the optical-electrical conversion to the plurality of radio frequency signals from the plurality of remote radio devices through a plurality of first convertors of the conversion device so as to generate a plurality of optical signals, or receiving and performing the optical-electrical conversion to the plurality of optical signals from a plurality of optical fibers of the optical fiber network so as to generate the plurality of radio frequency signals; and receiving and performing the optical-electrical conversion to the plurality of optical signals from the plurality optical fibers of the optical fiber network through a plurality of second convertors of the conversion device so as to generate the plurality of radio frequency signals, or receiving and performing the optical-electrical conversion to the plurality of radio frequency signals from the plurality of front-end processing devices so as to generate the plurality of optical signals.

In one embodiment, the wireless radio frequency conversion method further comprises receiving and adjusting the scale factor and the phase factor of the baseband signal from the baseband device through a digital beamformer, and performing the one-to-many conversion to the baseband signal through a one-to-many convertor of the digital beamformer so as to generate a first baseband signal and a second baseband signal, or receiving and performing the many-to-one conversion to the first baseband signal and the second baseband signal so as to generate the baseband signal. The step of performing the conversion between the baseband signal and the radio frequency signal through the remote radio device comprises: receiving and converting the first baseband signal from the one-to-many convertor through a first remote radio circuit of the remote radio device into a first radio frequency signal, or receiving and converting the first radio frequency signal into the first baseband signal; and receiving and converting the second baseband signal from the one-to-many convertor through a second remote radio circuit of the remote radio device into a second radio frequency signal, or receiving and converting the second radio frequency signal into the second baseband signal. The step of performing the optical-electrical conversion to the radio frequency signal through the conversion device comprises: receiving and performing the optical-electrical conversion and the one-to-many conversion to the first radio frequency signal from the first remote radio circuit through a first convertor of the conversion device so as to generate a plurality of optical signals, or receiving and performing the many-to-one conversion and the optical-electrical conversion to the plurality of optical signals from a plurality of optical fibers of the optical fiber network so as to generate the first radio frequency signal; receiving and performing the optical-electrical conversion and the one-to-many conversion to the second radio frequency signal from the second remote radio circuit through a second convertor of the conversion device so as to generate a plurality of optical signals, or receiving and performing the many-to-one conversion and the optical-electrical conversion to the plurality of optical signals from the plurality optical fibers of the optical fiber network so as to generate the second radio frequency signal; and receiving and performing the optical-electrical conversion to the plurality of optical signals from the plurality optical fibers of the optical fiber network through a plurality of third convertors of the conversion device so as to generate the plurality of radio frequency signals, or receiving and performing the optical-electrical conversion to the plurality of radio frequency signals so as to generate the plurality of optical signals. A number of the beamforming device is plural, the plurality of beamforming devices are configured to receive and adjust a plurality of amplitudes and a plurality of phases of the plurality of radio frequency signals from the plurality of third convertors, or configured to receive and adjust the plurality of amplitudes and the plurality of phases of the plurality of radio frequency signals from the plurality of front-end processing devices.

In one embodiment, the wireless radio frequency conversion method comprises receiving and adjusting the scale factor and the phase factor of the baseband signal from the baseband device through a digital beamformer, wherein a one-to-many convertor of the digital beamformer performs the one-to-many conversion to the baseband signal so as to generate a first baseband signal and a second baseband signal, or receiving and performing the many-to-one conversion to the first baseband signal and the second baseband signal so as to generate the baseband signal. The step of performing the conversion between the baseband signal and the radio frequency signal through the remote radio device comprises: receiving and converting the first baseband signal from the one-to-many convertor through a first remote radio circuit of the remote radio device into a first radio frequency signal, or receiving and converting the first radio frequency signal into the first baseband signal; and receiving and converting the second baseband signal from the one-to-many convertor through a second remote radio circuit of the remote radio device into a second radio frequency signal, or receiving and converting the second radio frequency signal into the second baseband signal. The step of performing the optical-electrical conversion to the radio frequency signal through the conversion device comprises: receiving and performing the optical-electrical conversion to the first radio frequency signal from the first remote radio circuit through a first convertor of the conversion device so as to generate a first optical signal, or receiving and performing the optical-electrical conversion to the first optical signal from the optical fiber network so as to generate the first radio frequency signal.

In one embodiment, the step of performing the optical-electrical conversion to the radio frequency signal through the conversion device further comprises: receiving and performing the optical-electrical conversion to the second radio frequency signal from the second remote radio circuit through a second convertor of the conversion device so as to generate a second optical signal, or receiving and performing the optical-electrical conversion to the second optical signal from the optical fiber network so as to generate the second radio frequency signal, wherein the one-to-many conversion device of the wireless radio frequency conversion system comprises a first one-to-many convertor and a second one-to-many convertor, wherein the first one-to-many convertor is configured to receive and perform the one-to-many conversion to the first optical signal from the first convertor so as to generate a plurality of optical signals, or configured to receive and perform the many-to-one conversion to the plurality of optical signals so as to generate the first optical signal, wherein the second one-to-many convertor is configured to receive and perform the one-to-many conversion to the second optical signal from the second convertor so as to generate a plurality of optical signals, or configured to receive and perform the many-to-one conversion to the plurality of optical signals so as to generate the second optical signal; and receiving and performing the optical-electrical conversion to the plurality of optical signals from the first one-to-many convertor and the second one-to-many convertor through a plurality of third convertors of the conversion device so as to generate the plurality of radio frequency signals, or receiving and performing the optical-electrical conversion to the plurality of radio frequency signals so as to generate the plurality of optical signals. a number of the beamforming device is plural, the plurality of beamforming devices are configured to receive and adjust a plurality of amplitudes and a plurality of phases of the plurality of radio frequency signals from the plurality of third convertors, or configured to receive and adjust the plurality of amplitudes and the plurality of phases of the plurality of radio frequency signals from the plurality of front-end processing devices.

Therefore, based on the technical content of the present disclosure, the present disclosure provides a wireless radio frequency conversion system and a wireless radio frequency conversion method. Since the wireless radio frequency conversion system and the wireless radio frequency conversion method adopt the conversion device and the optical fiber network to implement the connections between the elements. Therefore, the elements of the wireless radio frequency conversion system can be disposed on different sides of the wireless radio frequency conversion system. As such, the system deployment of the wireless radio frequency conversion system is more flexible and simpler.

It is to be understood that both the foregoing general description and the following detailed description are by examples, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DETAILED DESCRIPTION

Figure 1:
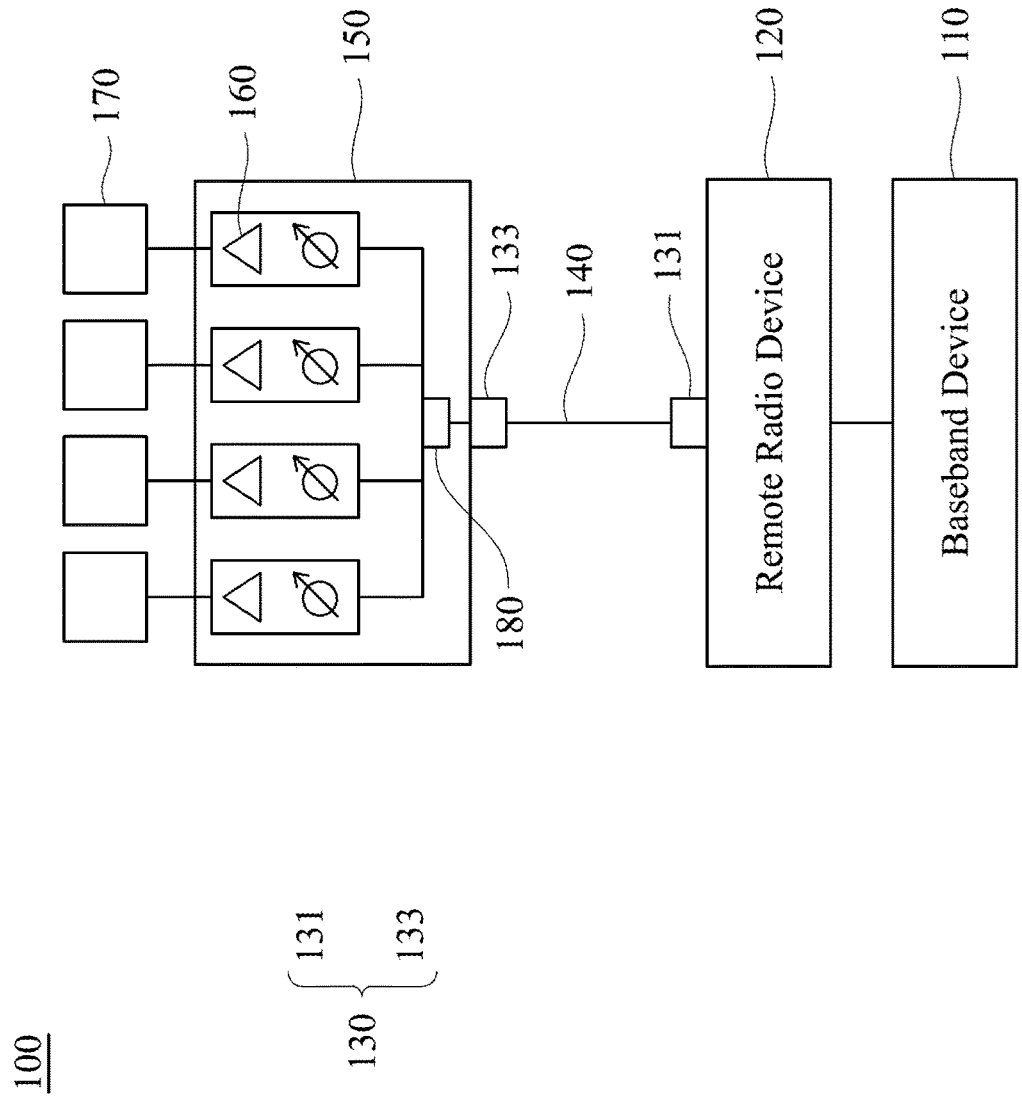
FIG. 1 depicts a schematic diagram of a wireless radio frequency conversion system according to one embodiment of the present disclosure.

Reference will now be made in detail to the present embodiments of the invention, examples of which are illustrated in the accompanying drawings. Wherever possible, the same reference numbers are used in the drawings and the description to refer to the same or like parts. However, the embodiments provided herein are intended as illustrative only since numerous modifications and variations therein will be apparent to those skilled in the art. Description of the operation does not intend to limit the operation sequence. Any structures resulting from recombination of elements with equivalent effects are within the scope of the present invention.

FIG. 1 depicts a schematic diagram of a wireless radio frequency conversion system 100 according to one embodiment of the present disclosure. As shown in the figure, the wireless radio frequency conversion system 100 includes a baseband device 110, a remote radio device 120, a conversion device 130, an optical fiber network 140, a beamforming device 150, a front-end processing device 160, and an antenna 170. The conversion device 130 includes a first convertor 131 and a second convertor 133.

In one embodiment, the baseband device 110 can be a baseband IC. The remote radio device 120 can be a remote radio unit (RRU). The conversion device 130 can be an optical-electrical convertor. The beamforming device 150 can be a beamforming processor. In addition, the beamforming processor can be an analog beamforming processor or a digital beamforming processor. The front-end processing device 160 can be a front-end module (FEM).

With respect to connections, the remote radio device 120 is connected to the baseband device 110. The first convertor 131 of the conversion device 130 is connected to the remote radio device 120. The optical fiber network 140 is connected to the first convertor 131 of the conversion device 130. The second convertor 133 of the conversion device 130 is connected to the optical fiber network 140. The beamforming device 150 is connected to the second convertor 133 of the conversion device 130. The front-end processing device 160 can be disposed inside the beamforming device 150, or the front-end processing device 160 is connected to the beamforming device 150. The antenna 170 is connected to the front-end processing device 160.

With respect to operations, the baseband device 110 is configured to generate or receive the baseband signal. The remote radio device 120 is configured to perform a conversion between the baseband signal and a radio frequency signal. In addition, the first convertor 131 of the conversion device 130 receives and performs an optical-electrical conversion to the radio frequency signal from the remote radio device 120 so as to generate the radio frequency signal which is converted through the optical-electrical conversion, or receives and performs the optical-electrical conversion to the radio frequency signal which is converted through the optical-electrical conversion from the optical fiber network 140 so as to generate the radio frequency signal. The optical fiber network 140 is configured to receive and transmit the radio frequency signal which is converted through the optical-electrical conversion from the first convertor 131 of the conversion device 130, or receive and transmit the radio frequency signal which is converted through the optical-electrical conversion from the second convertor 133 of the conversion device 130.

Subsequently, the second convertor 133 of the conversion device 130 receives and performs the optical-electrical conversion to the radio frequency signal which is converted through the optical-electrical conversion from the optical fiber network 140 so as to generate the radio frequency signal, or receives and performs the optical-electrical conversion to the radio frequency signal from the beamforming device 150 so as to generate the radio frequency signal which is converted. The one-to-many convertor 180 of the beamforming device 150 is configured to perform a one-to-many conversion to the radio frequency signal so as to generate a plurality of radio frequency signals, or perform a many-to-one conversion to the plurality of radio frequency signals so as to generate the radio frequency signal. In addition, the beamforming device 150 is configured to receive and adjust an amplitude and a phase of the radio frequency signal. The front-end processing device 160 is configured to receive and amplify the radio frequency signal from the beamforming device 150, or configured to receive and amplify the radio frequency signal from the antenna 170. The antenna 170 receives and transmits the radio frequency signal from the front-end processing device 160, or configured to wirelessly receive the radio frequency signal.

In one embodiment, the first convertor 131 of the conversion device 130 is configured to receive and perform the optical-electrical conversion to the radio frequency signal from the remote radio device 120 so as to generate the optical signal, or configured to receive and perform the optical-electrical conversion to the optical signal from the optical fiber network 140 so as to generate the radio frequency signal. On the other hand, the second convertor 133 of the conversion device 130 is configured to receive and perform the optical-electrical conversion to the optical signal from the optical fiber network 140 so as to generate the radio frequency signal, or configured to receive and perform the optical-electrical conversion to the radio frequency signal from the beamforming device 150 so as to generate the optical signal. Since the wireless radio frequency conversion system 100 adopts a plurality of convertors 131, 133 and the optical fiber network 140 to implement the connections between the elements. Therefore, the elements of the wireless radio frequency conversion system 100 of the present disclosure can be disposed on different sides of the wireless radio frequency conversion system 100. As such, the system deployment of the wireless radio frequency conversion system 100 is more flexible and simpler.

In another embodiment, the one-to-many convertor 180 of the beamforming device 150 is configured to receive and perform a one-to-many conversion to the radio frequency signal from the second convertor 133 of the conversion device 130 so as to generate a plurality of radio frequency signals, and the plurality of radio frequency signals are transmitted to the beamforming device 150 for adjusting the amplitude and the phase of the radio frequency signal.

Besides, the one-to-many convertor 180 of the beamforming device 150 is configured to receive and perform a many-to-one conversion to the plurality of radio frequency signals from the plurality of front-end processing devices 160 so as to combine the plurality of radio frequency signals into one radio frequency signal, and adjust the amplitude and the phase of the radio frequency signal. It is noted that, the present disclosure is not limited to the structure as shown in FIG. 1, it is merely an example for illustrating one of the implements of the present disclosure, and the scope of the present disclosure shall be defined on the bases of the claims as shown below. In view of the foregoing, it is intended that the present disclosure covers modifications and variations to the embodiments of the present disclosure, and modifications and variations to the embodiments of the present disclosure also fall within the scope of the following claims and their equivalents.

Figure 2:
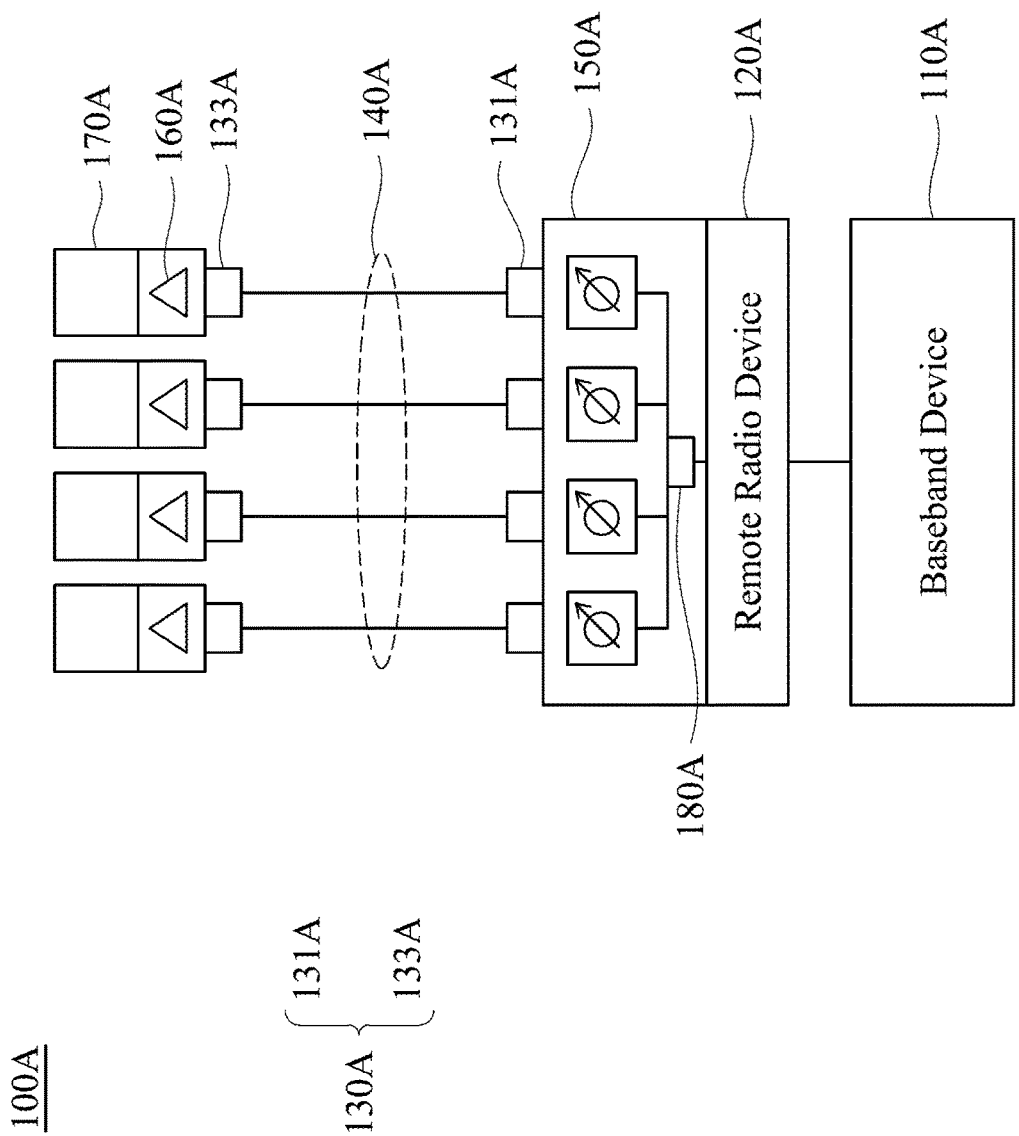
FIG. 2 depicts a schematic diagram of a wireless radio frequency conversion system according to one embodiment of the present disclosure.

FIG. 2 depicts a schematic diagram of a wireless radio frequency conversion system 100A according to one embodiment of the present disclosure. It is noted that, compared with the wireless radio frequency conversion system 100 shown in FIG. 1, the disposition of the conversion device 130A, the optical fiber network 140A, and the beamforming device 150A of the wireless radio frequency conversion system 100A shown in FIG. 2 is different, which will be describe in detailed as below.

As shown in the figure, the baseband device 110A, the remote radio device 120A, the conversion device 130A, and the beamforming device 150A can be disposed on one side of the wireless radio frequency conversion system 100A, and the front-end processing device 160A and antenna 170A can be disposed on another side of the wireless radio frequency conversion system 100A which is away from the remote radio device 120A. Since the wireless radio frequency conversion system 100A adopts the conversion device 130A and the optical fiber network 140A to implement the connections between the elements. Therefore, the elements of the wireless radio frequency conversion system 100A of the present disclosure can be disposed on different sides of the wireless radio frequency conversion system 100A. As such, the system deployment of the wireless radio frequency conversion system 100A is more flexible and simpler.

With respect to operations, the one-to-many convertor 180A of the beamforming device 150A is configured to receive and perform a one-to-many conversion to the radio frequency signal from the remote radio device 120A so as to generate a plurality of radio frequency signals, and transmit the plurality of radio frequency signals to the beamforming device 150A for adjusting the amplitude and the phase of the radio frequency signal. On the other hand, the beamforming device 150A is configured to receive and adjust the amplitude and the phase of the radio frequency signal from the first convertor 131A, and transmit the radio frequency signal to the one-to-many convertor 180A. The one-to-many convertor 180A is configured to perform a many-to-one conversion to the plurality of radio frequency signals to combine the plurality of radio frequency signals into one radio frequency signal.

In addition, the conversion device 130A includes a plurality of first convertors 131A and a plurality of second convertors 133A. The plurality of first convertors 131A of the conversion device 130A are configured to receive and perform an optical-electrical conversion to a plurality of radio frequency signals from the beamforming device 150A so as to generate a plurality of optical signals, or configured to receive and perform the optical-electrical conversion to the plurality of optical signals from a plurality of optical fibers of the optical fiber network 140A so as to generate the plurality of radio frequency signals. Besides, the plurality of second convertors 133A of the conversion device 130A are configured to receive and perform the optical-electrical conversion to a plurality of optical signals from the plurality of optical fibers of the optical fiber network 140A so as to generate the plurality of radio frequency signals, or configured to receive and perform the optical-electrical conversion to the plurality of radio frequency signals from the plurality of front-end processing devices 160A so as to generate the plurality of optical signals. It is noted that, the element in FIG. 2, whose symbol is similar to the symbol of the element in FIG. 1, has similar structure feature in connection with the element in FIG. 1. Therefore, a detail description regarding the structure feature of the element in FIG. 2 is omitted herein for the sake of brevity. In addition, the present disclosure is not limited to the structure as shown in FIG. 2, it is merely an example for illustrating one of the implements of the present disclosure, and the scope of the present disclosure shall be defined on the bases of the claims as shown below. In view of the foregoing, it is intended that the present disclosure covers modifications and variations to the embodiments of the present disclosure, and modifications and variations to the embodiments of the present disclosure also fall within the scope of the following claims and their equivalents.

Figure 3:
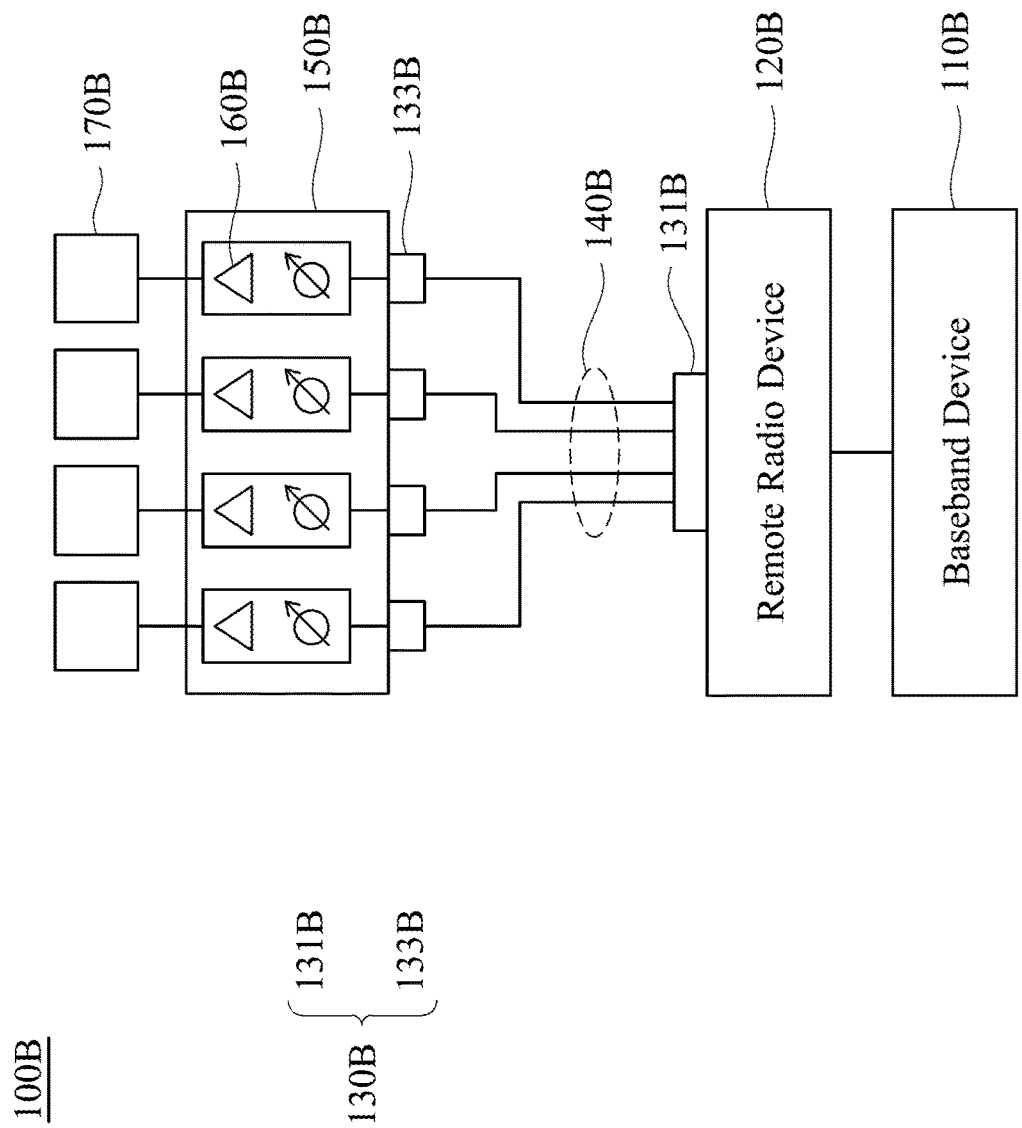
FIG. 3 depicts a schematic diagram of a wireless radio frequency conversion system according to one embodiment of the present disclosure.

FIG. 3 depicts a schematic diagram of a wireless radio frequency conversion system 100B according to one embodiment of the present disclosure. It is noted that, compared with the wireless radio frequency conversion system 100 shown in FIG. 1, the disposition of the conversion device 130B, the optical fiber network 140B, and the beamforming device 150B of the wireless radio frequency conversion system 100B shown in FIG. 3 is different, which will be describe in detailed as below.

As shown in the figure, the conversion device 130B includes a first convertor 131B and a plurality of second convertors 133B. In one embodiment, the first convertor 131B can be a 1:N optical-electrical convertor, and the 1:N optical-electrical convertor 131B can be disposed between the remote radio device 120B and the beamforming device 150B. Since the wireless radio frequency conversion system 100B adopts a plurality of convertors 131B, 133B and the optical fiber network 140B to implement the connections between the elements. Therefore, the elements of the wireless radio frequency conversion system 100B of the present disclosure can be disposed on different sides of the wireless radio frequency conversion system 100B. As such, the system deployment of the wireless radio frequency conversion system 100B is more flexible and simpler.

With respect to operations, the first convertor 131B is configured to receive and perform a one-to-many conversion and an optical-electrical conversion to the radio frequency signal from the remote radio device 120B so as to generate a plurality of optical signals, and simultaneously transmit the plurality of optical signals to the plurality of second convertors 133B through a plurality of optical fibers of the optical fiber network 140B, or the first convertor 131B is configured to receive and perform a many-to-one conversion and the optical-electrical conversion to the plurality of optical signals from the plurality of optical fibers of the optical fiber network 140B to combine the plurality of optical signals into one radio frequency signal. In addition, the plurality of second convertors 133B are configured to receive and perform the optical-electrical conversion to the plurality of optical signals from the plurality of optical fibers of the optical fiber network 140B so as to generate the plurality of radio frequency signals, or configured to receive and perform the optical-electrical conversion to the plurality of radio frequency signals from the beamforming device 150B so as to generate the plurality of optical signal.

In one embodiment, the beamforming device 150B is configured to receive and adjust a plurality of amplitudes and a plurality of phases of a plurality of radio frequency signals from the plurality of second convertors 133B, or configured to receive and adjust the plurality of amplitudes and the plurality of phases of the plurality of radio frequency signals from the plurality of front-end processing devices 160B. It is noted that, the element in FIG. 3, whose symbol is similar to the symbol of the element in FIG. 1, has similar structure feature in connection with the element in FIG. 1. Therefore, a detail description regarding the structure feature of the element in FIG. 3 is omitted herein for the sake of brevity. In addition, the present disclosure is not limited to the structure as shown in FIG. 3, it is merely an example for illustrating one of the implements of the present disclosure, and the scope of the present disclosure shall be defined on the bases of the claims as shown below. In view of the foregoing, it is intended that the present disclosure covers modifications and variations to the embodiments of the present disclosure, and modifications and variations to the embodiments of the present disclosure also fall within the scope of the following claims and their equivalents.

Figure 4:
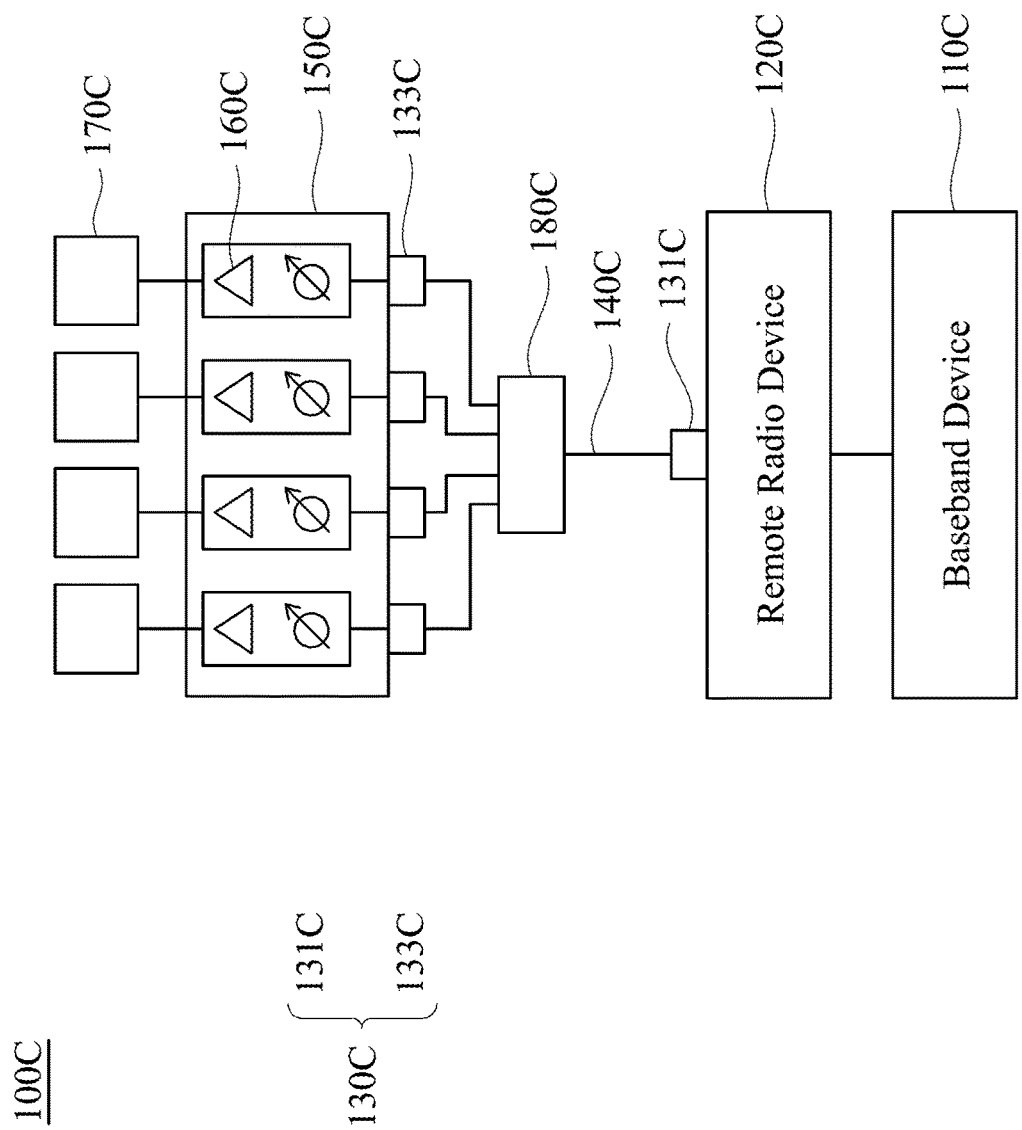
FIG. 4 depicts a schematic diagram of a wireless radio frequency conversion system according to one embodiment of the present disclosure.

FIG. 4 depicts a schematic diagram of a wireless radio frequency conversion system 100C according to one embodiment of the present disclosure. It is noted that, compared with the wireless radio frequency conversion system 100 shown in FIG. 1, the disposition of the conversion device 130C of the wireless radio frequency conversion system 100C shown in FIG. 4 is different, and the wireless radio frequency conversion system 100C further includes a one-to-many conversion device 180C, which will be describe in detailed as below.

As shown in the figure, the conversion device 130C includes a first convertor 131C and a plurality of second convertors 133C. The first convertor 131C is configured to receive and perform an optical-electrical conversion to a radio frequency signal from the remote radio device 120C so as to generate an optical signal, or configured to receive and perform the optical-electrical conversion to the optical signal from the optical fiber network 140C so as to generate the radio frequency signal. In addition, the one-to-many conversion device 180C of the wireless radio frequency conversion system 100C is configured to receive and perform a one-to-many conversion to the optical signal from the first convertor 131C through the optical fiber network 140C so as to generate a plurality of optical signals, or configured to receive and perform a many-to-one conversion to the plurality of optical signals from the plurality of second convertor 133C to combine the plurality of optical signals into one optical signal. Besides, the plurality of second convertors 133C are configured to receive and perform the optical-electrical conversion to the plurality of optical signals from the one-to-many conversion device 180C so as to generate the plurality of radio frequency signals, or configured to receive and perform the optical-electrical conversion to the plurality of radio frequency signals from the beamforming device 150C so as to generate the plurality of optical signals. Since the wireless radio frequency conversion system 100C adopts a plurality of convertors 131C, 133C and the optical fiber network 140C to implement the connections between the elements. Therefore, the elements of the wireless radio frequency conversion system 100C of the present disclosure can be disposed on different sides of the wireless radio frequency conversion system 100C. As such, the system deployment of the wireless radio frequency conversion system 100C is more flexible and simpler.

In one embodiment, the beamforming device 150C is configured to receive and adjust a plurality of amplitudes and a plurality of phases of a plurality of radio frequency signals from the plurality of second convertors 133C, or configured to receive and adjust the plurality of amplitudes and the plurality of phases of the plurality of radio frequency signals from the plurality of front-end processing devices 160C. It is noted that, the element in FIG. 4, whose symbol is similar to the symbol of the element in FIG. 1, has similar structure feature in connection with the element in FIG. 1. Therefore, a detail description regarding the structure feature of the element in FIG. 4 is omitted herein for the sake of brevity. In addition, the present disclosure is not limited to the structure as shown in FIG. 4, it is merely an example for illustrating one of the implements of the present disclosure, and the scope of the present disclosure shall be defined on the bases of the claims as shown below. In view of the foregoing, it is intended that the present disclosure covers modifications and variations to the embodiments of the present disclosure, and modifications and variations to the embodiments of the present disclosure also fall within the scope of the following claims and their equivalents.

Figure 5:
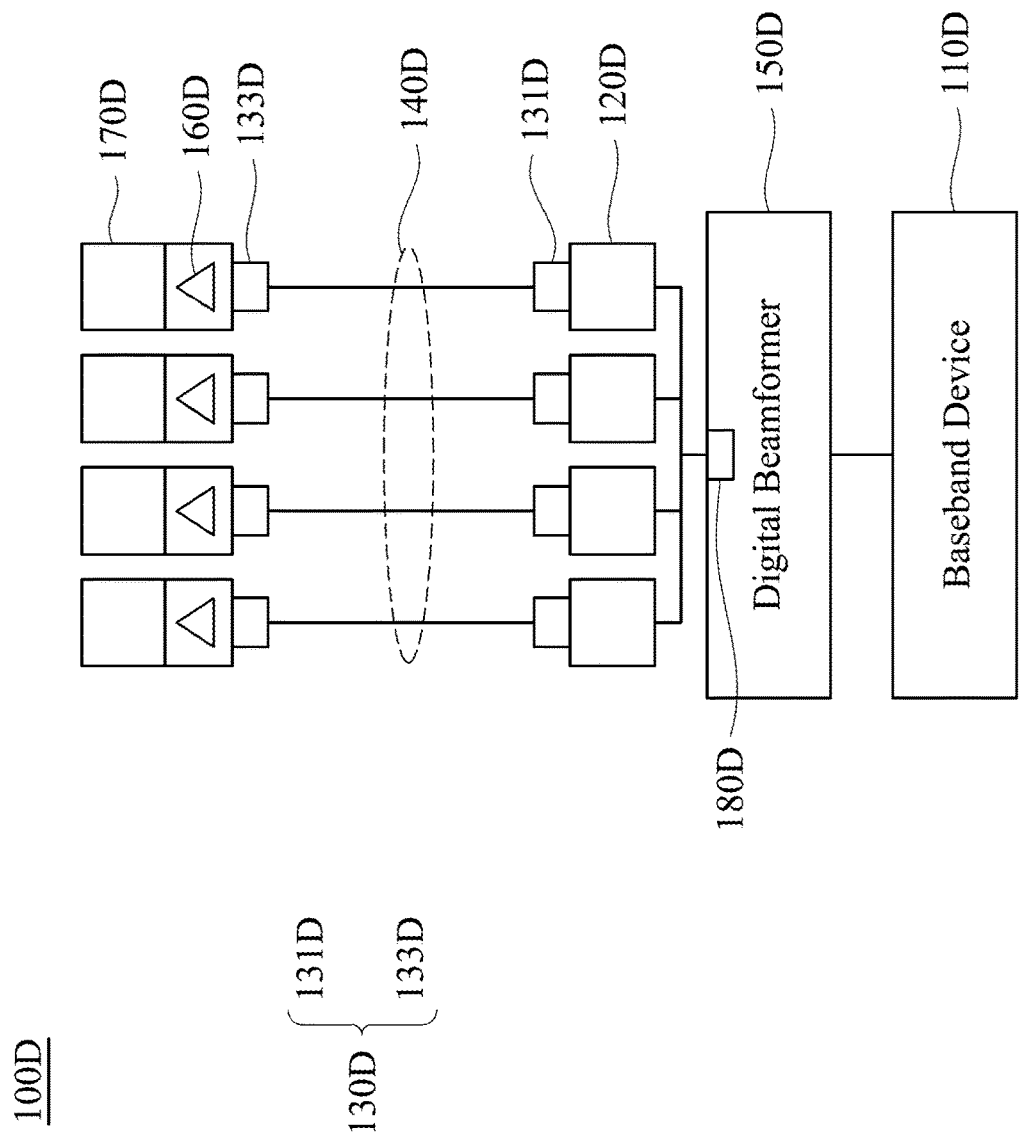
FIG. 5 depicts a schematic diagram of a wireless radio frequency conversion system according to one embodiment of the present disclosure.

FIG. 5 depicts a schematic diagram of a wireless radio frequency conversion system 100D according to one embodiment of the present disclosure. It is noted that, compared with the wireless radio frequency conversion system 100 shown in FIG. 1, the disposition of the remote radio device 120D, the conversion device 130D, the optical fiber network 140D, and the beamforming device 150D of the wireless radio frequency conversion system 100D shown in FIG. 5 is different, which will be describe in detailed as below.

As shown in the figure, since the wireless radio frequency conversion system 100D adopts the plurality of convertors 131D, 133D and the optical fiber network 140D to implement the connections between the elements. Therefore, the elements of the wireless radio frequency conversion system 100D of the present disclosure can be disposed on different sides of the wireless radio frequency conversion system 100D. For example, the front-end processing device 160D and the antenna 170D can be disposed on one side of the wireless radio frequency conversion system 100D, and the baseband device 110D, the remote radio device 120D, and the beamforming device 150D can be disposed on another side of the wireless radio frequency conversion system 100D. As such, the system deployment of the wireless radio frequency conversion system 100D is more flexible and simpler.

In one embodiment, the beamforming device 150D can be a digital beamformer. The digital beamformer 150D is configured to receive and adjust the scale factor and the phase factor of the baseband signal from the baseband device 110D. The one-to-many convertor 180D of the digital beamformer 150D performs a one-to-many conversion to the baseband signal so as to generate a plurality of baseband signals, or configured to receive and perform a many-to-one conversion to the plurality of baseband signals from the plurality of remote radio devices 120D to combine the plurality of baseband signals into one baseband signal. In addition, the plurality of remote radio devices 120D receive and convert the plurality of baseband signals from the digital beamformer 150D into the plurality of radio frequency signals, or configured to receive and convert the plurality of radio frequency signals into the plurality of baseband signals.

In another embodiment, the conversion device 130D includes a plurality of first convertors 131D and a plurality of second convertors 133D. The plurality of first convertors 131D are configured to receive and perform an optical-electrical conversion to a plurality of radio frequency signals from the plurality of remote radio devices 120D so as to generate a plurality of optical signals, or configured to receive and perform the optical-electrical conversion to the plurality of optical signals from a plurality of optical fibers of the optical fiber network 140D so as to generate the plurality of radio frequency signals.

In addition, the plurality of second convertors 133D are configured to receive and perform the optical-electrical conversion to the plurality of optical signals from the plurality of optical fibers of the optical fiber network 140D so as to generate the plurality of radio frequency signals, or configured to receive and perform the optical-electrical conversion to the plurality of radio frequency signals from the plurality of front-end processing devices 160D so as to generate the plurality of optical signals. It is noted that, the element in FIG. 5, whose symbol is similar to the symbol of the element in FIG. 1, has similar structure feature in connection with the element in FIG. 1. Therefore, a detail description regarding the structure feature of the element in FIG. 5 is omitted herein for the sake of brevity. In addition, the present disclosure is not limited to the structure as shown in FIG. 5, it is merely an example for illustrating one of the implements of the present disclosure, and the scope of the present disclosure shall be defined on the bases of the claims as shown below. In view of the foregoing, it is intended that the present disclosure covers modifications and variations to the embodiments of the present disclosure, and modifications and variations to the embodiments of the present disclosure also fall within the scope of the following claims and their equivalents.

Figure 6:
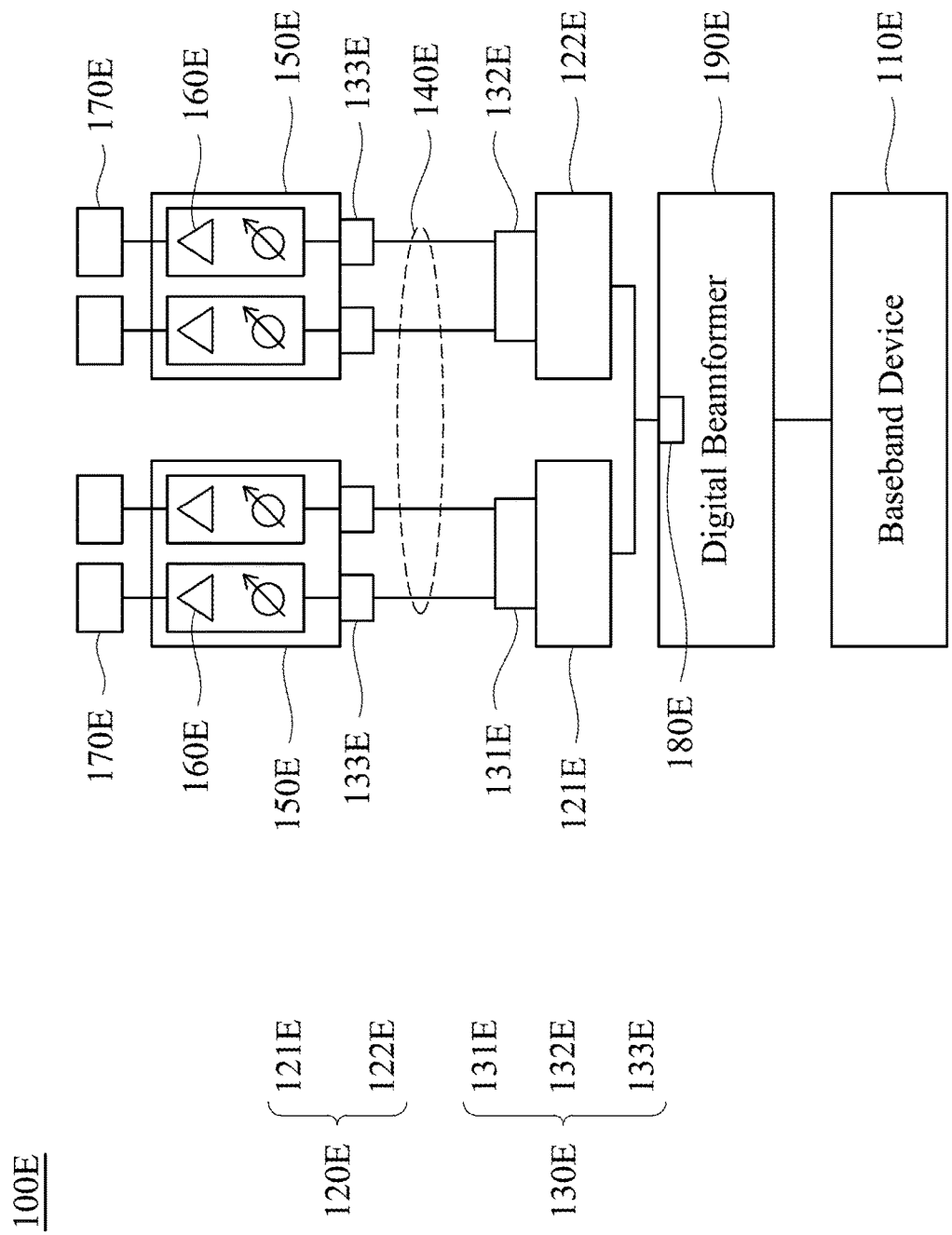
FIG. 6 depicts a schematic diagram of a wireless radio frequency conversion system according to one embodiment of the present disclosure.

FIG. 6 depicts a schematic diagram of a wireless radio frequency conversion system 100E according to one embodiment of the present disclosure. It is noted that, compared with the wireless radio frequency conversion system 100 shown in FIG. 1, the beamforming device of the wireless radio frequency conversion system 100D shown in FIG. 6 can be the analog beamforming device 150E or the digital beamformer 190E, and the disposition of the remote radio device 120E, the conversion device 130E, the optical fiber network 140E, and the beamforming device 150E, 190E of the wireless radio frequency conversion system 100E shown in FIG. 6 is different, which will be describe in detailed as below.

As shown in the figure, since the wireless radio frequency conversion system 100E adopts the conversion device 130E and the optical fiber network 140E to implement the connections between the elements. Therefore, the elements of the wireless radio frequency conversion system 100E of the present disclosure can be disposed on different sides of the wireless radio frequency conversion system 100E. For example, the analog beamforming device 150E, the front-end processing device 160E, and the antenna 170E can be disposed on one side of the wireless radio frequency conversion system 100E, and the baseband device 110E, the remote radio device 120E, and the digital beamformer 190E can be disposed on another side of the wireless radio frequency conversion system 100E. As such, the system deployment of the wireless radio frequency conversion system 100E is more flexible and simpler.

In one embodiment, the wireless radio frequency conversion system 100E further includes a digital beamformer 190E. The digital beamformer 190E is configured to receive and adjust the scale factor and the phase factor of the baseband signal from the baseband device 110E. The one-to-many convertor 180E of the digital beamformer 190E performs a one-to-many conversion to the baseband signal so as to generate the first baseband signal and the second baseband signal. On the other hand, the one-to-many convertor 180E of the digital beamformer 190E is configured to receive and perform a many-to-one conversion to the first baseband signal and the second baseband signal from the first remote radio circuit 121E and the second remote radio circuit 122E to combine the first baseband signal and the second baseband signal into one baseband signal, and digitally adjust the scale factor and the phase factor of the baseband signal from the digital beamformer 190E.

In addition, the remote radio device 120E includes a first remote radio circuit 121E and a second remote radio circuit 122E. The first remote radio circuit 121E is configured to receive and convert the first baseband signal into the first radio frequency signal from the digital beamformer 190E, or configured to receive and convert the first radio frequency signal from the first convertor 131E into the first baseband signal. The second remote radio circuit 122E is configured to receive and convert the second baseband signal from the digital beamformer 190E into the second radio frequency signal, or configured to receive and convert the second radio frequency signal from the second convertor 132E into the second baseband signal.

In one embodiment, the first convertor 131E of the conversion device 130E is configured to receive and perform an optical-electrical conversion and a one-to-many conversion to the first radio frequency signal from the first remote radio circuit 121E so as to generate a plurality of optical signals, or configured to receive and perform a many-to-one conversion and the optical-electrical conversion to the plurality of optical signals from a plurality of optical fibers of the optical fiber network 140E to combine the plurality of optical signals into one first radio frequency signal.

In another embodiment, the second convertor 132E of the conversion device 130E is configured to receive and perform an optical-electrical conversion and a one-to-many conversion to the second radio frequency signal from the second remote radio circuit 122E so as to generate a plurality of optical signals, or configured to receive and perform a many-to-one conversion and the optical-electrical conversion to the plurality of optical signals from the plurality of optical fibers of the optical fiber network 140E to combine the plurality of optical signals into one second radio frequency signal. The plurality of third convertors 133E of the conversion device 130E are configured to receive and perform the optical-electrical conversion to the plurality of optical signals from the plurality of optical fibers of the optical fiber network 140E so as to generate the plurality of radio frequency signals, or configured to receive and perform the optical-electrical conversion to the plurality of radio frequency signals from analog beamforming device 150E so as to generate the plurality of optical signals.

In still another embodiment, a number of the analog beamforming device 150E is plural, and the plurality of analog beamforming devices 150E are configured to receive and adjust a plurality of amplitudes and a plurality of phase of a plurality of radio frequency signals from the plurality of third convertors 133E, or configured to receive and adjust the plurality of amplitudes and the plurality of phases of the plurality of radio frequency signals from the plurality of front-end processing devices 160E. It is noted that, the element in FIG. 6, whose symbol is similar to the symbol of the element in FIG. 1, has similar structure feature in connection with the element in FIG. 1. Therefore, a detail description regarding the structure feature of the element in FIG. 6 is omitted herein for the sake of brevity. In addition, the present disclosure is not limited to the structure as shown in FIG. 6, it is merely an example for illustrating one of the implements of the present disclosure, and the scope of the present disclosure shall be defined on the bases of the claims as shown below. In view of the foregoing, it is intended that the present disclosure covers modifications and variations to the embodiments of the present disclosure, and modifications and variations to the embodiments of the present disclosure also fall within the scope of the following claims and their equivalents.

Figure 7:
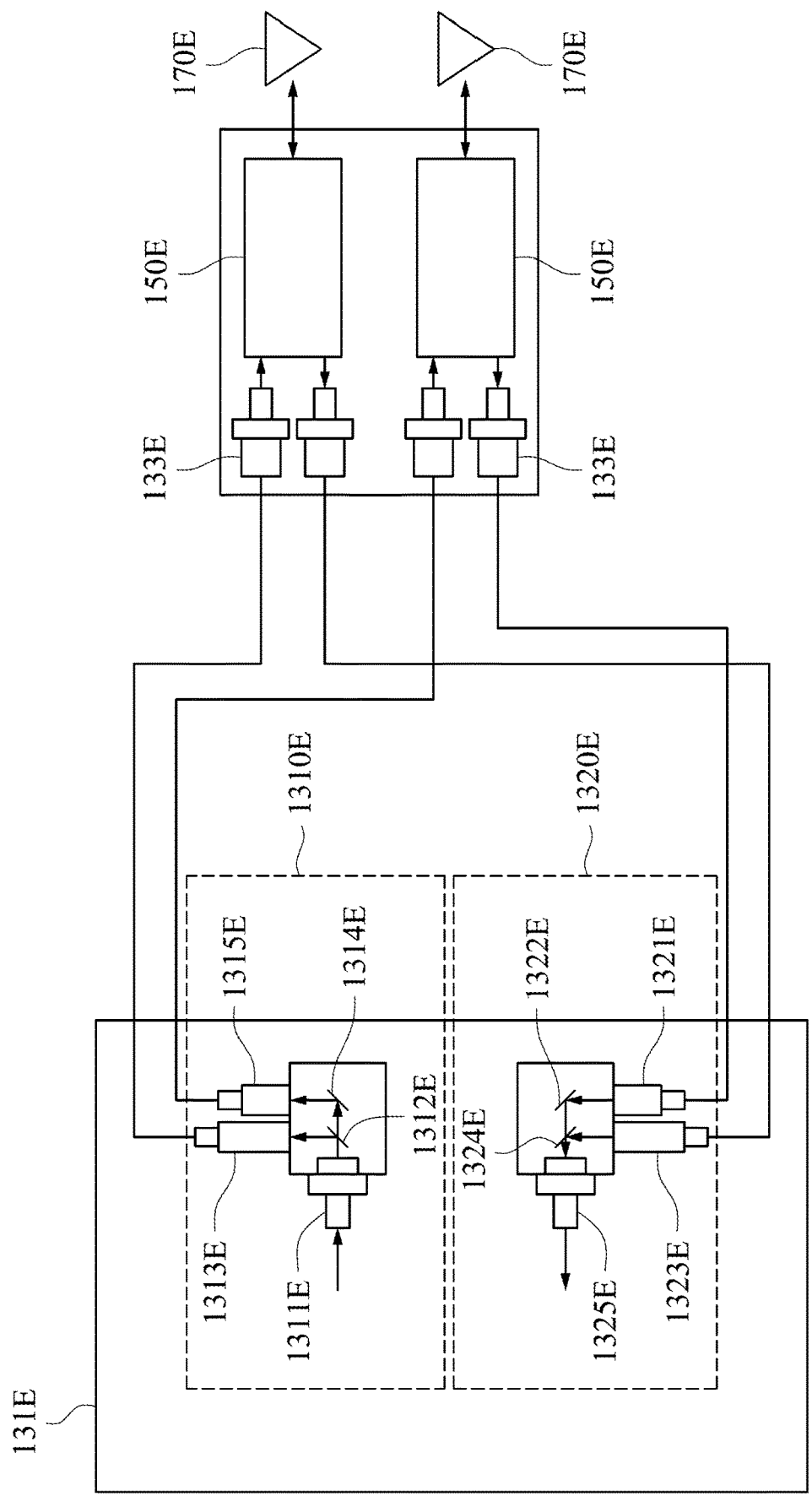
FIG. 7 depicts a schematic diagram of a portion of the wireless radio frequency conversion system as shown in FIG. 6 according to one embodiment of the present disclosure.

FIG. 7 depicts a schematic diagram of a portion of the wireless radio frequency conversion system 100E as shown in FIG. 6 according to one embodiment of the present disclosure. As shown in the figure, each of the first convertor 131E and the second convertor 132E includes a first one-to-many distributor 1310E. As can be seen in FIG. 7, the first convertor 131E is used as an example. The first one-to-many distributor 1310E of the first convertor 131E includes a first laser diode package structure 1311E, a first beamsplitter 1312E, a first connector 1313E, a second beamsplitter 1314E, and a second connector 1315E. The first laser diode package structure 1311E is configured to convert the first radio frequency signal generated by the first remote radio circuit 121E into the optical signal. The first beamsplitter 1312E is configured to partially reflect the optical signal so as to generate a first reflect signal, and let the optical signal partially penetrate so as to generate a first penetrating signal. The first connector 1313E is configured to output the first reflect signal to be the optical signal, and provide the optical signal to the third convertor 133E. The second beamsplitter 1314E is configured to reflect the first penetrating signal so as to generate a second reflect signal. The second connector 1315E is configured to output the second reflect signal to be another optical signal, and provide another optical signal to the third convertor 133E.

In another embodiment, each of the first convertor 131E and the second convertor 132E includes a second one-to-many distributor 1320E. As can be seen in FIG. 7, the first convertor 131E is used as an example. The second one-to-many distributor 1320E of the first convertor 131E includes a third connector 1321E, a third beamsplitter 1322E, a fourth connector 1323E, a fourth beamsplitter 1324E, and a second laser diode package structure 1325E. The third connector 1321E is configured to receive the optical signal. The third beamsplitter 1322E is configured to receive and reflect the optical signal from the third connector 1321E so as to generate a third reflect signal. The fourth connector 1323E is configured to receive another optical signal. The fourth beamsplitter 1324E is configured to receive and reflect another optical signal from the fourth connector 1323E, and the fourth beamsplitter 1324E is configured to receive and let the third reflect signal from the third beamsplitter 1322E penetrate to form the optical signal. The second laser diode package structure 1325E is configured to convert the optical signal into the first radio frequency signal, and provide the optical signal to the digital beamformer 190E. It is noted that, the element in FIG. 6 and FIG. 7, whose symbol is similar to the symbol of the element in FIG. 1, has similar structure feature in connection with the element in FIG. 1. Therefore, a detail description regarding the structure feature of the element in FIG. 6 and FIG. 7 is omitted herein for the sake of brevity. In addition, the present disclosure is not limited to the structure as shown in FIG. 6 and FIG. 7, it is merely an example for illustrating one of the implements of the present disclosure, and the scope of the present disclosure shall be defined on the bases of the claims as shown below. In view of the foregoing, it is intended that the present disclosure covers modifications and variations to the embodiments of the present disclosure, and modifications and variations to the embodiments of the present disclosure also fall within the scope of the following claims and their equivalents.

Figure 8:
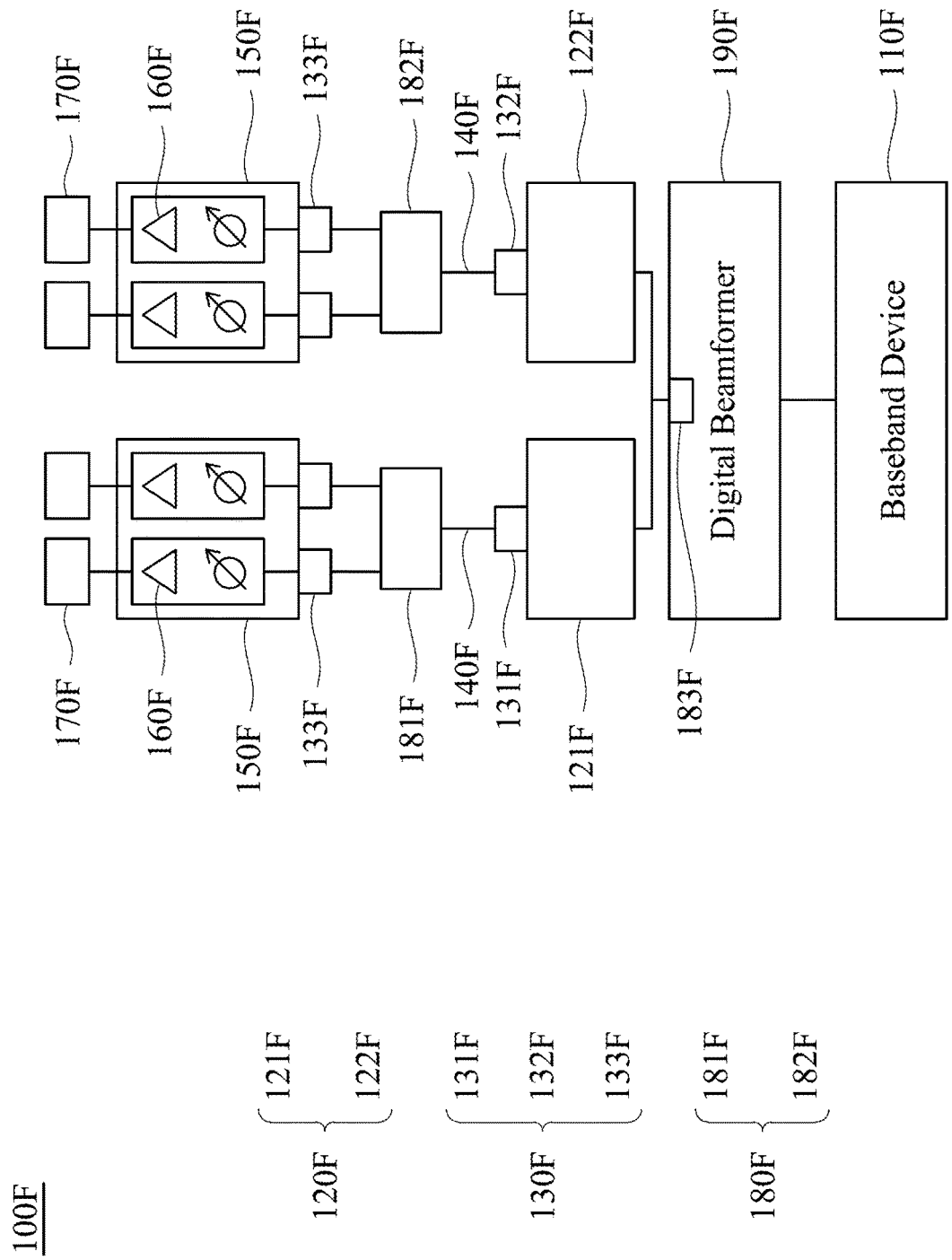
FIG. 8 depicts a schematic diagram of a wireless radio frequency conversion system according to one embodiment of the present disclosure.

FIG. 8 depicts a schematic diagram of a wireless radio frequency conversion system 100F according to one embodiment of the present disclosure. It is noted that, compared with the wireless radio frequency conversion system 100 shown in FIG. 1, the beamforming device of the wireless radio frequency conversion system 100F shown in FIG. 8 can be the analog beamforming device 150F or the digital beamformer 190F, and the disposition of the remote radio device 120F, the conversion device 130F, the optical fiber network 140F, and the beamforming devices 150F, 190F of the wireless radio frequency conversion system 100F shown in FIG. 8 is different, which will be describe in detailed as below.

As shown in the figure, since the wireless radio frequency conversion system 100F adopts the conversion device 130F and the optical fiber network 140F to implement the connections between the elements. Therefore, the elements of the wireless radio frequency conversion system 100F of the present disclosure can be disposed on different sides of the wireless radio frequency conversion system 100F. For example, the analog beamforming device 150F, the front-end processing device 160F, and the antenna 170F can be disposed on one side of the wireless radio frequency conversion system 100F, and the baseband device 110F, the remote radio device 120F, and the digital beamformer 190F can be disposed on another side of the wireless radio frequency conversion system 100F. As such, the system deployment of the wireless radio frequency conversion system 100F is more flexible and simpler.

In one embodiment, the wireless radio frequency conversion system 100F further includes a digital beamformer 190F. The digital beamformer 190F is configured to receive and adjust the scale factor and the phase factor of the baseband signal from the baseband device 110F. The one-to-many convertor 183F of the digital beamformer 190F performs a one-to-many conversion to the baseband signal so as to generate the first baseband signal and the second baseband signal. On the other hand, the one-to-many convertor 183F of the digital beamformer 190F is configured to receive and perform a many-to-one conversion to the first baseband signal and the second baseband signal from the first remote radio circuit 121F and the second remote radio circuit 122F to combine the first baseband signal and the second baseband signal into one baseband signal, and digitally adjust the scale factor and the phase factor of the baseband signal from the digital beamformer 190F.

In addition, the first remote radio circuit 121F of the remote radio device 120F is configured to receive and convert the first baseband signal from the digital beamformer 190F into the first radio frequency signal, or configured to receive and convert the first radio frequency signal into the first baseband signal. The second remote radio circuit 122F of the remote radio device 120F is configured to receive and convert the second baseband signal from the digital beamformer 190F into the second radio frequency signal, or configured to receive and convert the second radio frequency signal into the second baseband signal. The conversion device 130F includes a first convertor 131F. The first convertor 131F is configured to receive and perform an optical-electrical conversion to the first radio frequency signal from the first remote radio circuit 121F so as to generate the first optical signal, or configured to receive and perform the optical-electrical conversion to the first optical signal from the optical fiber network 140F so as to generate the first radio frequency signal.

In still another embodiment, the conversion device 130F further includes a second convertor 132F and a plurality of third convertors 133F. The second convertor 132F is configured to receive and perform an optical-electrical conversion to the second radio frequency signal from the second remote radio circuit 122F so as to generate the second optical signal, or configured to receive and perform the optical-electrical conversion to the second optical signal from the optical fiber network 140F so as to generate the second radio frequency signal. The one-to-many conversion device 180F of the wireless radio frequency conversion system 100F includes a first one-to-many convertor 181F and a second one-to-many convertor 182F. The first one-to-many convertor 181F is configured to receive and perform a one-to-many conversion to the first optical signal from the first convertor 131F so as to generate a plurality of optical signals, or configured to receive and perform a many-to-one conversion to the plurality of optical signals to combine the plurality of optical signals into one first optical signal. The second one-to-many convertor 182F is configured to receive and perform the one-to-many conversion to the second optical signal from the second convertor 132F so as to generate the plurality of optical signals, or configured to receive and perform the many-to-one conversion to the plurality of optical signals to combine the plurality of optical signals into one second optical signal. The plurality of third convertor 133F is configured to receive and perform the optical-electrical conversion to the plurality of optical signals from the first one-to-many convertor 181F and the second one-to-many convertor 182F so as to generate the plurality of radio frequency signals, or configured to receive and perform the optical-electrical conversion to the plurality of radio frequency signals from the analog beamforming device 150F so as to generate the plurality of optical signals.

In one embodiment, a number of the analog beamforming device 150F is plural. The plurality of analog beamforming devices 150F are configured to receive and adjust a plurality of amplitudes and a plurality of phases of a plurality of radio frequency signals from a plurality of third convertors 133F, or configured to receive and adjust the plurality of amplitudes and the plurality of phases of the plurality of radio frequency signals from the plurality of front-end processing devices 160F.

Figure 9:
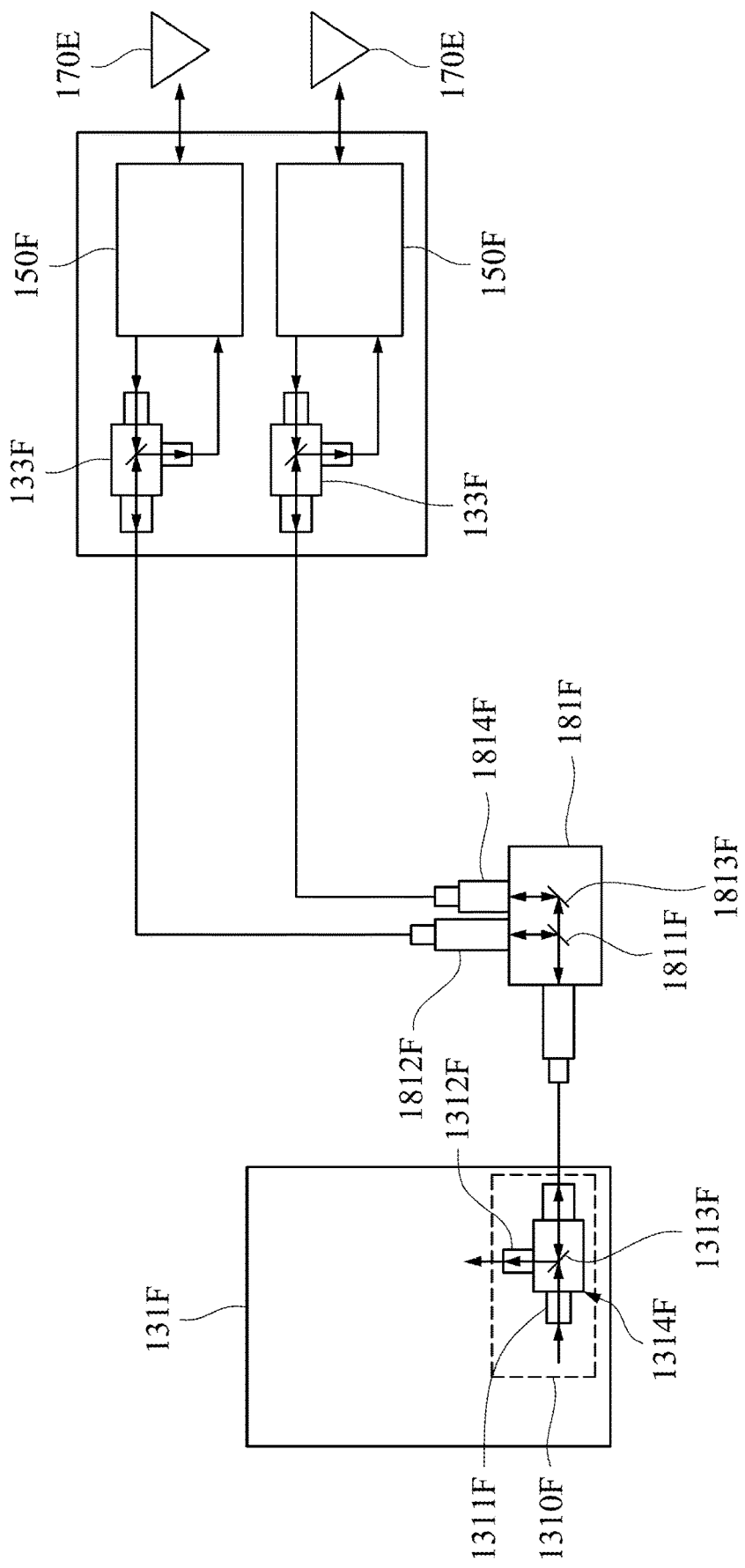
FIG. 9 depicts a schematic diagram of a portion of the wireless radio frequency conversion system as shown in FIG. 8 according to one embodiment of the present disclosure.

FIG. 9 depicts a schematic diagram of a portion of the wireless radio frequency conversion system 100F as shown in FIG. 8 according to one embodiment of the present disclosure. As shown in the figure, each of the first convertor 131F and the second convertor 132F includes a bidirectional optical transceiver 1310F. As can be seen in FIG. 9, the first convertor 131F is used as an example. The bidirectional optical transceiver 1310F includes a first laser diode package structure 1311F, a second laser diode package structure 1312F, a filter 1313F, and a housing 1314F.

With respect to operations, the first laser diode package structure 1311F is configured to convert the first radio frequency signal generated by the first remote radio circuit 121F into the first optical signal. The second laser diode package structure 1312F is configured to convert the first optical signal into the first radio frequency signal. The filter 1313F is configured to be penetrated by the first optical signal of the first laser diode package structure 1311F, and configured to reflect the first optical signal to the second laser diode package structure 1312F. The filter 1313F is disposed inside the housing 1314F. The first laser diode package structure 1311F and the second laser diode package structure 1312F are disposed outside the housing 1314F, and attached to the housing 1314F.

In one embodiment, each of the first one-to-many convertor 181F and the second one-to-many convertor 182F includes a first beamsplitter 1811F, a first connector 1812F, a second beamsplitter 1813F, and a second connector 1814F. The first beamsplitter 1811F is configured to partially reflect the first optical signal generated by the first convertor 131F so as to generate the first reflect signal, and let the first optical signal partially penetrate so as to generate the first penetrating signal. The first connector 1812F is configured to output the first reflect signal to be the optical signal. The second beamsplitter 1813F is configured to reflect the first penetrating signal so as to generate the second reflect signal. The second connector 1814F is configured to output the second reflect signal to be another optical signal, and provide the another optical signal to the third convertor 133F.

In another embodiment, the second connector 1814F is configured to receive the optical signal. The second beamsplitter 1813F is configured to receive and reflect the optical signal from the second connector 1814F so as to generate the third reflect signal. The first connector 1812F is configured to receive another optical signal. The first beamsplitter 1811F is configured to receive and reflect another optical signal from the first connector 1812F, and receive and let the third reflect signal from the second beamsplitter 1813F penetrate so as to generate the first optical signal, and provide the first optical signal to the first convertor 131F. It is noted that, the element in FIG. 8 and FIG. 9, whose symbol is similar to the symbol of the element in FIG. 1, has similar structure feature in connection with the element in FIG. 1. Therefore, a detail description regarding the structure feature of the element in FIG. 8 and FIG. 9 is omitted herein for the sake of brevity. In addition, the present disclosure is not limited to the structure as shown in FIG. 8 and FIG. 9, it is merely an example for illustrating one of the implements of the present disclosure, and the scope of the present disclosure shall be defined on the bases of the claims as shown below. In view of the foregoing, it is intended that the present disclosure covers modifications and variations to the embodiments of the present disclosure, and modifications and variations to the embodiments of the present disclosure also fall within the scope of the following claims and their equivalents.

Figure 10:
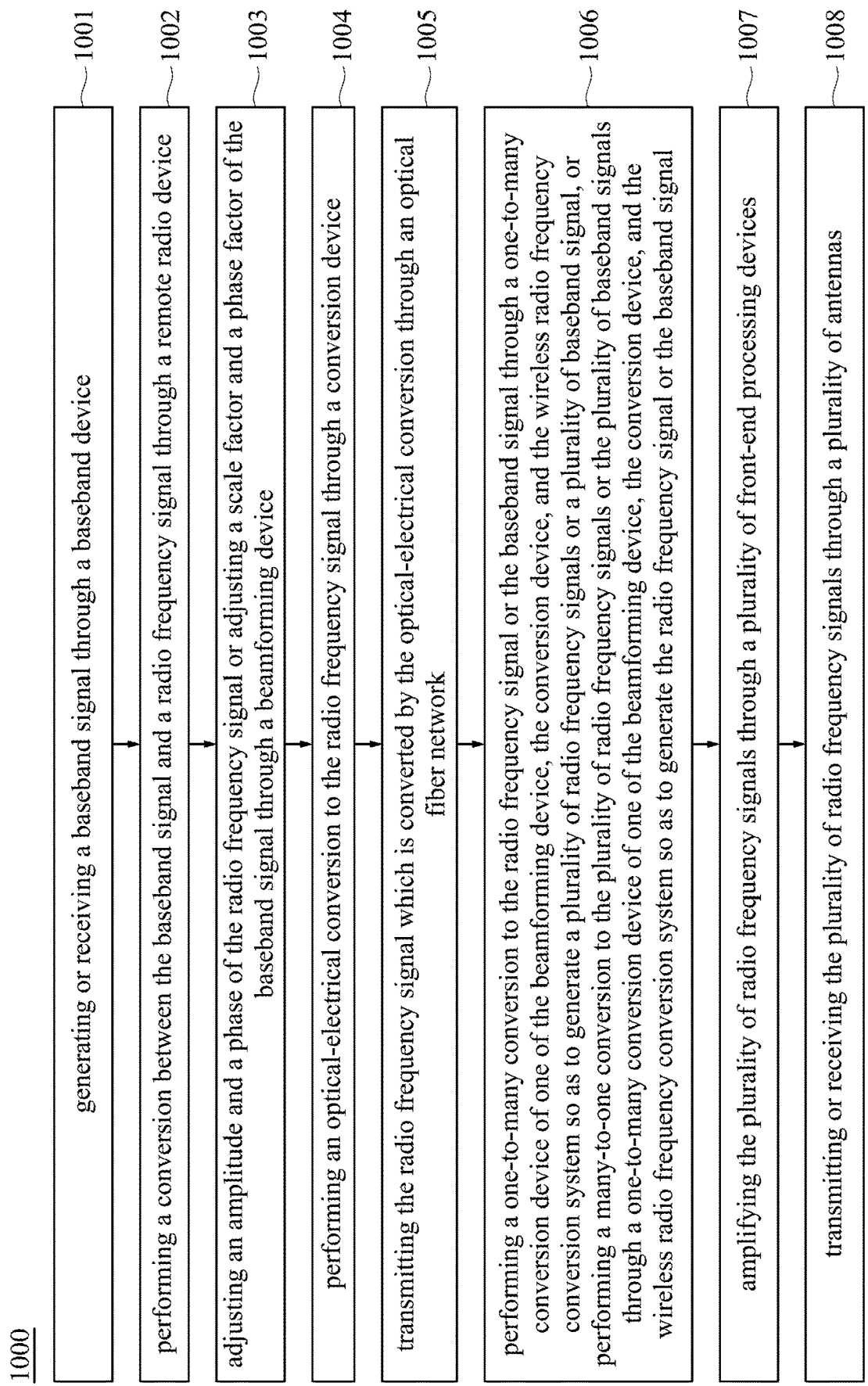
FIG. 10 depicts a flow diagram of a wireless radio frequency conversion method according to one embodiment of the present disclosure.

FIG. 10 depicts a flow diagram of a wireless radio frequency conversion method 1000 according to one embodiment of the present disclosure. For facilitating the understanding of the wireless radio frequency conversion method 1000 of the present disclosure, please refer to both FIG. 1 and FIG. 10.

As shown in FIG. 1 and FIG. 10, the wireless radio frequency conversion method 1000 includes: (step 1001) generating or receiving a baseband signal through a baseband device 110; (step 1002) performing a conversion between the baseband signal and a radio frequency signal through a remote radio device 120; (step 1003) adjusting an amplitude and a phase of the radio frequency signal or adjusting a scale factor and a phase factor of the baseband signal through a beamforming device 150; (step 1004) performing an optical-electrical conversion to the radio frequency signal through a conversion device 130; (step 1005) transmitting the radio frequency signal which is converted by the optical-electrical conversion through an optical fiber network 140; (step 1006) performing a one-to-many conversion to the radio frequency signal or the baseband signal through a one-to-many conversion device of one of the beamforming device 150, the conversion device 130, and the wireless radio frequency conversion system 100 (e.g., the one-to-many conversion device 180C as shown in FIG. 4) so as to generate a plurality of radio frequency signals or a plurality of baseband signal, or performing a many-to-one conversion to the plurality of radio frequency signals or the plurality of baseband signals through a one-to-many conversion device of one of the beamforming device 150, the conversion device 130, and the wireless radio frequency conversion system 100 so as to generate the radio frequency signal or the baseband signal; (step 1007) amplifying the plurality of radio frequency signals through a plurality of front-end processing devices 160; and (step 1008) transmitting or receiving the plurality of radio frequency signals through a plurality of antennas 170.

It is noted that, the present disclosure is not limited to the steps as shown in FIG. 10, it is merely an example for illustrating one of the implements of the present disclosure, and the scope of the present disclosure shall be defined on the bases of the claims as shown below. In view of the foregoing, it is intended that the present disclosure covers modifications and variations to the embodiments of the present disclosure, and modifications and variations to the embodiments of the present disclosure also fall within the scope of the following claims and their equivalents. In addition, as may be appreciated by persons having ordinary skill in the art, the steps of the wireless radio frequency conversion method 1000 in FIG. 10 are named according to the function they perform, and such naming is provided to facilitate the understanding of the present disclosure but not to limit the steps. Combining the steps into a single step or dividing any one of the steps into multiple steps, switching any step so as to be a part of another step, or adjusting the sequence of the steps falls within the scope of the embodiments of the present disclosure.

In one embodiment, the operations in the embodiments of the wireless radio frequency conversion method 1000 of the present disclosure are similar to the operations in the embodiments of the wireless radio frequency conversion systems 100, 100A~100F as shown in FIG. 1 to FIG. 9 of the present disclosure, and the detailed operations regarding the wireless radio frequency conversion method 1000 will be omitted herein for the sake of brevity.

It can be understood from the embodiments of the present disclosure that application of the present disclosure has the following advantages. The present disclosure provides a wireless radio frequency conversion system and a wireless radio frequency conversion method. Since the wireless radio frequency conversion system and the wireless radio frequency conversion method adopt the conversion device and the optical fiber network to implement the connections between the elements. Therefore, the elements of the wireless radio frequency conversion system can be disposed on different sides of the wireless radio frequency conversion system. As such, the system deployment of the wireless radio frequency conversion system is more flexible and simpler Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A wireless radio frequency conversion system, comprising:
    a baseband device, configured to generate or receive a baseband signal;
    a remote radio device, configured to receive the baseband signal from the baseband device and configured to perform a conversion between the baseband signal and a radio frequency signal;
    a beamforming device, configured to adjust an amplitude and a phase of the radio frequency signal, or adjust a scale factor and a phase factor of the baseband signal;
    a conversion device, configured to perform an optical-electrical conversion to the radio frequency signal;
    wherein one of the beamforming device, the conversion device, and the wireless radio frequency conversion system having a one-to-many conversion device is configured to perform a one-to-many conversion to the radio frequency signal or the baseband signal so as to generate a plurality of radio frequency signals or a plurality of baseband signals, or perform a many-to-one conversion to the plurality of radio frequency signals or the plurality of baseband signals so as to generate the radio frequency signal or the baseband signal;
    an optical fiber network, connected between the conversion device and the one-to-many conversion device, configured to simultaneously transmit the plurality of radio frequency signals transmitted from the one-to-many conversion device, wherein the one-to-many conversion device performs the one-to-many conversion to the radio frequency signal to generate the plurality of radio frequency signals;
    a plurality of front-end processing devices, configured to amplify the plurality of radio frequency signals; and
    a plurality of antennas, configured to transmit or receive the plurality of radio frequency signals.

2. The wireless radio frequency conversion system of claim 1, wherein the conversion device comprises:
    a first convertor, configured to receive and perform the optical-electrical conversion to the radio frequency signal from the remote radio device so as to generate an optical signal, or configured to receive and perform the optical-electrical conversion to the optical signal from the optical fiber network so as to generate the radio frequency signal; and
    a second convertor, configured to receive and perform the optical-electrical conversion to the optical signal from the optical fiber network so as to generate the radio frequency signal, or configured to receive and perform the optical-electrical conversion to the radio frequency signal from the beamforming device so as to generate the optical signal.

3. The wireless radio frequency conversion system of claim 2, wherein a one-to-many convertor of the beamforming device is configured to receive and perform the one-to-many conversion to the radio frequency signal from the second convertor so as to generate the plurality of radio frequency signals, or configured to receive and perform the many-to-one conversion to the plurality of radio frequency signals from the plurality of front-end processing devices as so to generate the radio frequency signal.

4. The wireless radio frequency conversion system of claim 1,
wherein the conversion device comprises:
a plurality of first convertors, configured to receive and perform the optical-electrical conversion to the plurality of radio frequency signals from the beamforming device so as to generate a plurality of optical signals, or configured to receive and perform the optical-electrical conversion to the plurality of optical signals from a plurality of optical fibers of the optical fiber network so as to generate the plurality of radio frequency signals; and
a plurality of second convertors, configured to receive and perform the optical-electrical conversion to the plurality of optical signals from the plurality optical fibers of the optical fiber network so as to generate the plurality of radio frequency signals, or configured to receive and perform the optical-electrical conversion to the plurality of radio frequency signals from the plurality of front-end processing devices so as to generate the plurality of optical signals.

5. The wireless radio frequency conversion system of claim 1, wherein the conversion device comprises:
a first convertor, configured to receive and perform the optical-electrical conversion and the one-to-many conversion to the radio frequency signal from the remote radio device so as to generate a plurality of optical signals, or configured to receive and perform the many-to-one conversion and the optical-electrical conversion to the plurality of optical signals from a plurality of optical fibers of the optical fiber network so as to generate the radio frequency signal; and
a plurality of second convertors, configured to receive and perform the optical-electrical conversion to the plurality of optical signals from the plurality optical fibers of the optical fiber network so as to generate the plurality of radio frequency signals, or configured to receive and perform the optical-electrical conversion to the plurality of radio frequency signals from the beamforming device so as to generate the plurality of optical signals.

6. The wireless radio frequency conversion system of claim 5, wherein the beamforming device is configured to receive and adjust a plurality of amplitudes and a plurality of phases of the plurality of radio frequency signals from the second convertors, or configured to receive and adjust the plurality of amplitudes and the plurality of phases of the plurality of radio frequency signals from the plurality of front-end processing devices.

7. The wireless radio frequency conversion system of claim 1, wherein the conversion device comprises:
a first convertor, configured to receive and perform the optical-electrical conversion to the radio frequency signal from the remote radio device so as to generate an optical signal, or configured to receive and perform the optical-electrical conversion to the optical signal so as to generate the radio frequency signal, wherein the one-to-many conversion device of the wireless radio frequency conversion system is configured to receive and perform the one-to-many conversion to the optical signal from the first convertor so as to generate a plurality of optical signals, or configured to receive and perform the many-to-one conversion to the plurality of optical signals so as to generate the optical signal; and a plurality of second convertors, configured to receive and perform the optical-electrical conversion to the plurality of optical signals from the one-to-many conversion device of the wireless radio frequency conversion system so as to generate the plurality of radio frequency signals, or configured to receive and perform the optical-electrical conversion to the plurality of radio frequency signals from the beamforming device so as to generate the plurality of optical signals.

8. The wireless radio frequency conversion system of claim 7, wherein the beamforming device is configured to receive and adjust a plurality of amplitudes and a plurality of phases of the plurality of radio frequency signals from the plurality of second convertors, or configured to receive and adjust the plurality of amplitudes and the plurality of phases of the plurality of radio frequency signals from the plurality of front-end processing devices.

9. The wireless radio frequency conversion system of claim 1, wherein the beamforming device is:
a digital beamformer, configured to receive and adjust the scale factor and the phase factor of the baseband signal from the baseband device, wherein a one-to-many convertor of the digital beamformer is configured to perform the one-to-many conversion to the baseband signal so as to generate the plurality of baseband signals, or configured to receive and perform the many-to-one conversion to the plurality of baseband signals so as to generate the baseband signal;
wherein a number of the remote radio device is plural, the plurality of remote radio devices receive and convert the plurality of baseband signals from the one-to-many convertor into a plurality of radio frequency signals, or configured to receive and convert the plurality of radio frequency signals into the plurality of baseband signals.

10. The wireless radio frequency conversion system of claim 9, wherein the conversion device comprises:
plurality of first convertors, configured to receive and perform the optical-electrical conversion to the plurality of radio frequency signals from the plurality of remote radio devices so as to generate a plurality of optical signals, or configured to receive and perform the optical-electrical conversion to the plurality of optical signals from a plurality of optical fibers of the optical fiber network so as to generate the plurality of radio frequency signals; and
a plurality of second convertors, configured to receive and perform the optical-electrical conversion to the plurality of optical signals from the plurality optical fibers of the optical fiber network so as to generate the plurality of radio frequency signals, or configured to receive and perform the optical-electrical conversion to the plurality of radio frequency signals from the plurality of front-end processing devices so as to generate the plurality of optical signals.

11. The wireless radio frequency conversion system of claim 1, further comprising:
a digital beamformer, configured to receive and adjust the scale factor and the phase factor of the baseband signal from the baseband device, wherein a one-to-many convertor of the digital beamformer is configured to perform the one-to-many conversion to the baseband signal so as to generate a first baseband signal and a second baseband signal, or configured to receive and perform the many-to-one conversion to the first baseband signal and the second baseband signal so as to generate the baseband signal;
wherein the remote radio device comprises:

a first remote radio circuit, configured to receive and convert the first baseband signal from the one-to-many convertor into a first radio frequency signal, or configured to receive and convert the first radio frequency signal into the first baseband signal; and a second remote radio circuit, configured to receive and convert the second baseband signal from the one-to-many convertor into a second radio frequency signal, or configured to receive and convert the second radio frequency signal into the second baseband signal;

wherein the conversion device comprises:

a first convertor, configured to receive and perform the optical-electrical conversion and the one-to-many conversion to the first radio frequency signal from the first remote radio circuit so as to generate a plurality of optical signals, or configured to receive and perform the many-to-one conversion and the optical-electrical conversion to the plurality of optical signals from a plurality of optical fibers of the optical fiber network so as to generate the first radio frequency signal.

12. The wireless radio frequency conversion system of claim 11, wherein the conversion device further comprises:

a second convertor, configured to receive and perform the optical-electrical conversion and one-to-many conversion to the second radio frequency signal from the second remote radio circuit so as to generate a plurality of optical signals, or configured to receive and perform the many-to-one conversion and the optical-electrical conversion to the plurality of optical signals from the plurality optical fibers of the optical fiber network so as to generate the second radio frequency signal; and a plurality of third convertors, configured to receive and perform the optical-electrical conversion to the plurality of optical signals from the plurality optical fibers of the optical fiber network so as to generate the plurality of radio frequency signals, or configured to receive and perform the optical-electrical conversion to the plurality of radio frequency signals so as to generate the plurality of optical signals.

13. The wireless radio frequency conversion system of claim 12, wherein a number of the beamforming device is plural, the plurality of beamforming devices are configured to receive and adjust a plurality of amplitudes and a plurality of phases of the plurality of radio frequency signals from the plurality of third convertors, or configured to receive and adjust the plurality of amplitudes and the plurality of phases of the plurality of radio frequency signals from the plurality of front-end processing devices.

14. The wireless radio frequency conversion system of claim 13, wherein each of the first convertor and the second convertor comprises a first one-to-many distributor, wherein the first one-to-many distributor comprises:

a first laser diode package structure, configured to convert the first radio frequency signal or the second radio frequency signal into one of the plurality of optical signals;

a first beamsplitter, configured to partially reflect one of the plurality of optical signals to generate a first reflect signal, and partially penetrate one of the plurality of optical signals to generate a first penetrating signal;

a first connector, configured to output the first reflect signal to be one of the plurality of optical signals;

a second beamsplitter, configured to reflect the first penetrating signal to generate a second reflect signal; and a second connector, configured to output the second reflect signal to be one of the plurality of optical signals.

15. The wireless radio frequency conversion system of claim 14, wherein each of the first convertor and the second convertor comprises a second one-to-many distributor, wherein the second one-to-many distributor comprises:

a third connector, configured to receive one of the plurality of optical signals;

a third beamsplitter, configured to receive and reflect one of the plurality of optical signals from the third connector to generate a third reflect signal;

a fourth connector, configured to receive one of the plurality of optical signals;

a fourth beamsplitter, configured to receive and reflect one of the plurality of optical signals from the fourth connector, and receive and penetrate the third reflect signal from the third beamsplitter to generate one of the plurality of optical signals; and a second laser diode package structure, configured to convert one of the plurality of optical signals into the first radio frequency signal or the second radio frequency signal.

16. The wireless radio frequency conversion system of claim 1, further comprising:

a digital beamformer, configured to receive and adjust the scale factor and the phase factor of the baseband signal from the baseband device, wherein a one-to-many convertor of the digital beamformer performs the one-to-many conversion to the baseband signal so as to generate a first baseband signal and a second baseband signal, or configured to receive and perform the many-to-one conversion to the first baseband signal and the second baseband signal so as to generate the baseband signal;

wherein the remote radio device comprises:

a first remote radio circuit, configured to receive and convert the first baseband signal from the one-to-many convertor into a first radio frequency signal, or configured to receive and convert the first radio frequency signal into the first baseband signal; and a second remote radio circuit, configured to receive and convert the second baseband signal from the one-to-many convertor into a second radio frequency signal, or configured to receive and convert the second radio frequency signal into the second baseband signal;

wherein the conversion device comprises:

a first convertor, configured to receive and perform the optical-electrical conversion to the first radio frequency signal from the first remote radio circuit so as to generate a first optical signal, or configured to receive and perform the optical-electrical conversion to the first optical signal from the optical fiber network so as to generate the first radio frequency signal.

17. The wireless radio frequency conversion system of claim 16, wherein the conversion device further comprises:

a second convertor, configured to receive and perform the optical-electrical conversion to the second radio frequency signal from the second remote radio circuit so as to generate a second optical signal, or configured to receive and perform the optical-electrical conversion to the second optical signal from the optical fiber network so as to generate the second radio frequency signal, wherein the one-to-many conversion device of the wireless radio frequency conversion system comprises a first one-to-many convertor and a second one-to-many convertor, wherein the first one-to-many convertor is configured to receive and perform the one-to-many conversion to the first optical signal from the first convertor so as to generate a plurality of optical signals, or configured to receive and perform the many-to-one conversion to the plurality of optical signals so as to generate the first optical signal, wherein the second one-to-many convertor is configured to receive and perform the one-to-many conversion to the second optical signal from the second convertor so as to generate a plurality of optical signals, or configured to receive and perform the many-to-one conversion to the plurality of optical signals so as to generate the second optical signal; and a plurality of third convertors, configured to receive and perform the optical-electrical conversion to the plurality of optical signals from the first one-to-many convertor and the second one-to-many convertor so as to generate the plurality of radio frequency signals, or configured to receive and perform the optical-electrical conversion to the plurality of radio frequency signals so as to generate the plurality of optical signals.

18. The wireless radio frequency conversion system of claim 17, wherein a number of the beamforming device is plural, the plurality of beamforming devices are configured to receive and adjust a plurality of amplitudes and a plurality of phases of the plurality of radio frequency signals from the plurality of third convertors, or configured to receive and adjust the plurality of amplitudes and the plurality of phases of the plurality of radio frequency signals from the plurality of front-end processing devices.

19. The wireless radio frequency conversion system of claim 18, wherein each of the first convertor and the second convertor comprises a bidirectional optical transceiver, wherein the bidirectional optical transceiver comprises:
a first laser diode package structure, configured to convert the first radio frequency signal or the second radio frequency signal into the first optical signal or the second optical signal;
a second laser diode package structure, configured to convert the first optical signal or the second optical signal into the first radio frequency signal or the second radio frequency signal;
a filter, configured to penetrate the first optical signal or the second optical signal of the first laser diode package structure, and configured to reflect the first optical signal or the second optical signal to the second laser diode package structure; and
a housing, wherein the filter is disposed inside the housing, and the first laser diode package structure and the second laser diode package structure are disposed outside the housing and attached to the housing.

20. The wireless radio frequency conversion system of claim 19, wherein each of the first one-to-many convertor and the second one-to-many convertor comprises:
a first beamsplitter, configured to partially reflect the first optical signal or the second optical signal so as to generate a first reflect signal, and partially penetrate the first optical signal or the second optical signal so as to generate a first penetrating signal;
a first connector, configured to output the first reflect signal to be one of the plurality of optical signals;
a second beamsplitter, configured to reflect the first penetrating signal so as to generate a second reflect signal; and
a second connector, configured to output the second reflect signal to be one of the plurality of optical signals.

21. The wireless radio frequency conversion system of claim 20, wherein :

the second connector is configured to receive one of the plurality of optical signals;
the second beamsplitter is configured to receive and reflect one of the plurality of optical signals from the second connector to generate a third reflect signal;
the first connector is configured to receive one of the plurality of optical signals;
the first beamsplitter is configured to receive and reflect one of the plurality of optical signals from the first connector, and receive and penetrate the third reflect signal from the second beamsplitter to generate the first optical signal or the second optical signal.

22. A wireless radio frequency conversion method, comprising:
generating or receiving a baseband signal through a baseband device;
performing a conversion between the baseband signal and a radio frequency signal through a remote radio device, wherein the remote radio device receives the baseband signal from the baseband device;
adjusting an amplitude and a phase of the radio frequency signal or adjusting a scale factor and a phase factor of the baseband signal through a beamforming device;
performing an optical-electrical conversion to the radio frequency signal through a conversion device;
performing a one-to-many conversion to the radio frequency signal or the baseband signal through a one-to-many conversion device of one of the beamforming device, the conversion device, and a wireless radio frequency conversion system so as to generate a plurality of radio frequency signals or a plurality of baseband signals, or performing a many-to-one conversion to the plurality of radio frequency signals or the plurality of baseband signals through the one-to-many conversion device of one of the beamforming device, the conversion device, and the wireless radio frequency conversion system so as to generate the radio frequency signal or the baseband signal;
simultaneously transmitting the plurality of radio frequency signals transmitted from the one-to-many conversion device through an optical fiber network connected between the conversion device and the one-to-many conversion device, wherein the one-to-many conversion device performs the one-to-many conversion to the radio frequency signal to generate the plurality of radio frequency signals;
amplifying the plurality of radio frequency signals through a plurality of front-end processing devices; and
transmitting or receiving the plurality of radio frequency signals through a plurality of antennas.

23. The wireless radio frequency conversion method of claim 22, wherein performing the optical-electrical conversion to the radio frequency signal through the conversion device comprises:
receiving and performing the optical-electrical conversion to the radio frequency signal from the remote radio device through a first convertor of the conversion device so as to generate an optical signal, or receiving and performing the optical-electrical conversion to the optical signal from the optical fiber network so as to generate the radio frequency signal; and
receiving and performing the optical-electrical conversion to the optical signal from the optical fiber network through a second convertor of the conversion device so as to generate the radio frequency signal, or receiving and performing the optical-electrical conversion to the radio frequency signal from the beamforming device so as to generate the optical signal;

wherein performing the one-to-many conversion to the radio frequency signal or the baseband signal through the one-to-many conversion device of one of the beamforming device, the conversion device, and the wireless radio frequency conversion system so as to generate the plurality of radio frequency signals or the plurality of baseband signals, or performing the many-to-one conversion to the plurality of radio frequency signals or the plurality of baseband signals through the one-to-many conversion device of one of the beamforming device, the conversion device, and the wireless radio frequency conversion system so as to generate the radio frequency signal or the baseband signal comprises:

receiving and performing the one-to-many conversion to the radio frequency signal from the second convertor through a one-to-many convertor of the beamforming device so as to generate the plurality of radio frequency signals, or receiving and performing the many-to-one conversion to the plurality of radio frequency signals from the plurality of front-end processing devices so as to generate the radio frequency signal.

24. The wireless radio frequency conversion method of claim 22, wherein performing the one-to-many conversion to the radio frequency signal or the baseband signal through the one-to-many conversion device of one of the beamforming device, the conversion device, and the wireless radio frequency conversion system so as to generate the plurality of radio frequency signals or the plurality of baseband signals, or performing the many-to-one conversion to the plurality of radio frequency signals or the plurality of baseband signals through the one-to-many conversion device of one of the beamforming device, the conversion device, and the wireless radio frequency conversion system so as to generate the radio frequency signal or the baseband signal comprises:

receiving and performing the one-to-many conversion to the radio frequency signal from the remote radio device through a one-to-many convertor of the beamforming device so as to generate the plurality of radio frequency signals, or receiving and performing the many-to-one conversion to the plurality of radio frequency signals so as to generate the radio frequency signal;

wherein performing the optical-electrical conversion to the radio frequency signal through the conversion device comprises:

receiving and performing the optical-electrical conversion to the plurality of radio frequency signals from the beamforming device through a plurality of first convertors of the conversion device so as to generate a plurality of optical signals, or receiving and performing the optical-electrical conversion to the plurality of optical signals from a plurality of optical fibers of the optical fiber network so as to generate the plurality of radio frequency signals; and receiving and performing the optical-electrical conversion to the plurality of optical signals from the plurality optical fibers of the optical fiber network through a plurality of second convertors of the conversion device so as to generate the plurality of radio frequency signals, or receiving and performing the optical-electrical conversion to the plurality of radio frequency signals from the plurality of front-end processing devices so as to generate the plurality of optical signals.

25. The wireless radio frequency conversion method of claim 22, wherein performing the optical-electrical conversion to the radio frequency signal through the conversion device comprises:

receiving and performing the optical-electrical conversion and the one-to-many conversion to the radio frequency signal from the remote radio device through a first convertor of the conversion device so as to generate a plurality of optical signals, or receiving and performing the many-to-one conversion and the optical-electrical conversion to the plurality of optical signals from a plurality of optical fibers of the optical fiber network so as to generate the radio frequency signal; and receiving and performing the optical-electrical conversion to the plurality of optical signals from the plurality optical fibers of the optical fiber network through a plurality of second convertors of the conversion device so as to generate the plurality of radio frequency signals, or receiving and performing the optical-electrical conversion to the plurality of radio frequency signals from the beamforming device so as to generate the plurality of optical signals;

wherein performing the one-to-many conversion to the radio frequency signal or the baseband signal through the one-to-many conversion device of one of the beamforming device, the conversion device, and the wireless radio frequency conversion system so as to generate the plurality of radio frequency signals or the plurality of baseband signals, or performing the many-to-one conversion to the plurality of radio frequency signals or the plurality of baseband signals through the one-to-many conversion device of one of the beamforming device, the conversion device, and the wireless radio frequency conversion system so as to generate the radio frequency signal or the baseband signal comprises:

receiving and adjusting a plurality of amplitudes and a plurality of phases of the plurality of radio frequency signals from the second convertors through the beamforming device, or receiving and adjusting the plurality of amplitudes and the plurality of phases of the plurality of radio frequency signals from the plurality of front-end processing devices.

26. The wireless radio frequency conversion method of claim 22, wherein performing the optical-electrical conversion to the radio frequency signal through the conversion device comprises:

receiving and performing the optical-electrical conversion to the radio frequency signal from the remote radio device through a first convertor of the conversion device so as to generate an optical signal, or receiving and performing the optical-electrical conversion to the optical signal so as to generate the radio frequency signal; and receiving and performing the optical-electrical conversion to a plurality of optical signals from the one-to-many conversion device of the wireless radio frequency conversion system through a plurality of second convertors of the conversion device so as to generate the plurality of radio frequency signals, or receiving and performing the optical-electrical conversion to the plurality of radio frequency signals from the beamforming device so as to generate the plurality of optical signals;

wherein performing the one-to-many conversion to the radio frequency signal or the baseband signal through the one-to-many conversion device of one of the beamforming device, the conversion device, and the wireless radio frequency conversion system so as to generate the plurality of radio frequency signals or the plurality of baseband signals, or performing the many-to-one conversion to the plurality of radio frequency signals or the plurality of baseband signals through the one-to-many conversion device of one of the beamforming device, the conversion device, and the wireless radio frequency conversion system so as to generate the radio frequency signal or the baseband signal comprises:
receiving and performing the one-to-many conversion to the optical signal from the first convertor through the one-to-many conversion device of the wireless radio frequency conversion system so as to generate a plurality of optical signals, or receiving and performing the many-to-one conversion to the plurality of optical signals so as to generate the optical signal;
wherein adjusting the amplitude and the phase of the radio frequency signal through the beamforming device comprises:
receiving and adjusting a plurality of amplitudes and a plurality of phases of the plurality of radio frequency signals from the second convertors through the beamforming device, or receiving and adjusting the plurality of amplitudes and the plurality of phases of the plurality of radio frequency signals from the plurality of front-end processing devices.

27. The wireless radio frequency conversion method of claim 22, wherein the beamforming device is a digital beamformer, wherein the wireless radio frequency conversion method further comprises:
receiving and adjusting the scale factor and the phase factor of the baseband signal from the baseband device through the digital beamformer, and performing the one-to-many conversion to the baseband signal through a one-to-many convertor of the digital beamformer so as to generate the plurality of baseband signals, or receiving and performing the many-to-one conversion to the plurality of baseband signals so as to generate the baseband signal;
wherein performing the conversion between the baseband signal and the radio frequency signal through the remote radio device comprises:
receiving and converting the plurality of baseband signals from the one-to-many convertor through a plurality of remote radio devices into a plurality of radio frequency signals, or receiving and converting the plurality of radio frequency signals into the plurality of baseband signals;
wherein performing the optical-electrical conversion to the radio frequency signal through the conversion device comprises:
receiving and performing the optical-electrical conversion to the plurality of radio frequency signals from the plurality of remote radio devices through a plurality of first convertors of the conversion device so as to generate a plurality of optical signals, or receiving and performing the optical-electrical conversion to the plurality of optical signals from a plurality of optical fibers of the optical fiber network so as to generate the plurality of radio frequency signals; and
receiving and performing the optical-electrical conversion to the plurality of optical signals from the plurality optical fibers of the optical fiber network through a plurality of second convertors of the conversion device so as to generate the plurality of radio frequency signals, or receiving and performing the optical-electrical conversion to the plurality of radio frequency signals from the plurality of front-end processing devices so as to generate the plurality of optical signals.

28. The wireless radio frequency conversion method of claim 22, further comprising:
receiving and adjusting the scale factor and the phase factor of the baseband signal from the baseband device through a digital beamformer, and performing the one-to-many conversion to the baseband signal through a one-to-many convertor of the digital beamformer so as to generate a first baseband signal and a second baseband signal, or receiving and performing the many-to-one conversion to the first baseband signal and the second baseband signal so as to generate the baseband signal;
wherein performing the conversion between the baseband signal and the radio frequency signal through the remote radio device comprises:
receiving and converting the first baseband signal from the one-to-many convertor through a first remote radio circuit of the remote radio device into a first radio frequency signal, or receiving and converting the first radio frequency signal into the first baseband signal; and
receiving and converting the second baseband signal from the one-to-many convertor through a second remote radio circuit of the remote radio device into a second radio frequency signal, or receiving and converting the second radio frequency signal into the second baseband signal;
wherein performing the optical-electrical conversion to the radio frequency signal through the conversion device comprises:
receiving and performing the optical-electrical conversion and the one-to-many conversion to the first radio frequency signal from the first remote radio circuit through a first convertor of the conversion device so as to generate a plurality of optical signals, or receiving and performing the many-to-one conversion and the optical-electrical conversion to the plurality of optical signals from a plurality of optical fibers of the optical fiber network so as to generate the first radio frequency signal;
receiving and performing the optical-electrical conversion and the one-to-many conversion to the second radio frequency signal from the second remote radio circuit through a second convertor of the conversion device so as to generate a plurality of optical signals, or receiving and performing the many-to-one conversion and the optical-electrical conversion to the plurality of optical signals from the plurality optical fibers of the optical fiber network so as to generate the second radio frequency signal; and
receiving and performing the optical-electrical conversion to the plurality of optical signals from the plurality optical fibers of the optical fiber network through a plurality of third convertors of the conversion device so as to generate the plurality of radio frequency signals, or receiving and performing the optical-electrical conversion to the plurality of radio frequency signals so as to generate the plurality of optical signals;
wherein a number of the beamforming device is plural, the plurality of beamforming devices are configured to receive and adjust a plurality of amplitudes and a plurality of phases of the plurality of radio frequency signals from the plurality of third convertors, or configured to receive and adjust the plurality of amplitudes and the plurality of phases of the plurality of radio frequency signals from the plurality of front-end processing devices.

29. The wireless radio frequency conversion method of claim 22, further comprising:
receiving and adjusting the scale factor and the phase factor of the baseband signal from the baseband device through a digital beamformer, wherein a one-to-many convertor of the digital beamformer performs the one-to-many conversion to the baseband signal so as to generate a first baseband signal and a second baseband signal, or receiving and performing the many-to-one conversion to the first baseband signal and the second baseband signal so as to generate the baseband signal;
wherein performing the conversion between the baseband signal and the radio frequency signal through the remote radio device comprises:
receiving and converting the first baseband signal from the one-to-many convertor through a first remote radio circuit of the remote radio device into a first radio frequency signal, or receiving and converting the first radio frequency signal into the first baseband signal; and
receiving and converting the second baseband signal from the one-to-many convertor through a second remote radio circuit of the remote radio device into a second radio frequency signal, or receiving and converting the second radio frequency signal into the second baseband signal;
wherein performing the optical-electrical conversion to the radio frequency signal through the conversion device comprises:
receiving and performing the optical-electrical conversion to the first radio frequency signal from the first remote radio circuit through a first convertor of the conversion device so as to generate a first optical signal, or receiving and performing the optical-electrical conversion to the first optical signal from the optical fiber network so as to generate the first radio frequency signal.

30. The wireless radio frequency conversion method of claim 29, wherein performing the optical-electrical conversion to the radio frequency signal through the conversion device further comprises:
receiving and performing the optical-electrical conversion to the second radio frequency signal from the second remote radio circuit through a second convertor of the conversion device so as to generate a second optical signal, or receiving and performing the optical-electrical conversion to the second optical signal from the optical fiber network so as to generate the second radio frequency signal, wherein the one-to-many conversion device of the wireless radio frequency conversion system comprises a first one-to-many convertor and a second one-to-many convertor, wherein the first one-to-many convertor is configured to receive and perform the one-to-many conversion to the first optical signal from the first convertor so as to generate a plurality of optical signals, or configured to receive and perform the many-to-one conversion to the plurality of optical signals so as to generate the first optical signal, wherein the second one-to-many convertor is configured to receive and perform the one-to-many conversion to the second optical signal from the second convertor so as to generate a plurality of optical signals, or configured to receive and perform the many-to-one conversion to the plurality of optical signals so as to generate the second optical signal; and
receiving and performing the optical-electrical conversion to the plurality of optical signals from the first one-to-many convertor and the second one-to-many convertor through a plurality of third convertors of the conversion device so as to generate the plurality of radio frequency signals, or receiving and performing the optical-electrical conversion to the plurality of radio frequency signals so as to generate the plurality of optical signals;
wherein a number of the beamforming device is plural, the plurality of beamforming devices are configured to receive and adjust a plurality of amplitudes and a plurality of phases of the plurality of radio frequency signals from the plurality of third convertors, or configured to receive and adjust the plurality of amplitudes and the plurality of phases of the plurality of radio frequency signals from the plurality of front-end processing devices.

* * * * *